(12) United States Patent
Gudan

(10) Patent No.: US 9,127,992 B2
(45) Date of Patent: Sep. 8, 2015

(54) WIDE-AREA PRESSURE SENSOR WITH REDUCED POWER CONSUMPTION

(71) Applicant: Kenneth F. Gudan, Sunnyvale, CA (US)

(72) Inventor: Kenneth F. Gudan, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 168 days.

(21) Appl. No.: 13/787,767

(22) Filed: Mar. 6, 2013

(65) Prior Publication Data

US 2014/0251029 A1 Sep. 11, 2014

(51) Int. Cl.
| | |
|---|---|
| *G01L 1/00* | (2006.01) |
| *G06Q 10/08* | (2012.01) |
| *H01H 13/702* | (2006.01) |
| *H01H 11/00* | (2006.01) |
| *H01H 35/26* | (2006.01) |

(52) U.S. Cl.
CPC ............. *G01L 1/00* (2013.01); *G06Q 10/087* (2013.01); *H01H 11/00* (2013.01); *H01H 13/702* (2013.01); *H01H 35/2657* (2013.01); *Y10T 29/49105* (2015.01)

(58) Field of Classification Search
CPC . H01H 13/702; H01H 35/2657; H01H 11/00; G01L 1/00; G06Q 10/087; Y10T 29/49105; G06K 17/0022
See application file for complete search history.

(56) References Cited

U.S. PATENT DOCUMENTS

| | | | |
|---|---|---|---|
| 4,356,358 A | 10/1982 | Fukukura | |
| 4,409,450 A | 10/1983 | Blades | |
| 4,510,353 A * | 4/1985 | Nemitz | .......................... 200/5 A |
| 4,777,488 A * | 10/1988 | Carlman et al. | ............. 340/12.5 |
| 5,175,443 A | 12/1992 | Tabuchi | |
| 5,429,006 A * | 7/1995 | Tamori | ..................... 73/862.046 |
| 6,139,952 A | 10/2000 | Furuya et al. | |
| 6,215,418 B1 | 4/2001 | Struthers | |
| 6,858,811 B2 | 2/2005 | Fitzgerald et al. | |
| 2006/0103613 A1* | 5/2006 | Chui | ............................... 345/85 |
| 2007/0056385 A1* | 3/2007 | Lorenz | ........................... 73/818 |

(Continued)

FOREIGN PATENT DOCUMENTS

JP 57 161923 10/1982

OTHER PUBLICATIONS

European Extended Search Report for European Application No. EP 13 19 8569, dated Jul. 11, 2014, 7 pages.

(Continued)

*Primary Examiner* — Lisa Caputo
*Assistant Examiner* — Philip Cotey
(74) *Attorney, Agent, or Firm* — Patent Law Works LLP

(57) ABSTRACT

The disclosure includes a system and method for implementing a wide-area pressure sensor with reduced power consumption. The system includes a first layer printed with conductive ink in a first pattern that includes a first portion of an AND array and a first portion of an OR array, a second layer printed with conductive ink in a second pattern that includes a second portion of the AND array and a second portion of the OR array, and a separation barrier that goes between the first layer and the second layer. These AND and OR array switches can be combined together in one or more zones to create a wide-area pressure sensor with reduced pincount and power consumption, and can be used to determine the location of pressure points in a wide-area.

14 Claims, 18 Drawing Sheets

(56) References Cited

U.S. PATENT DOCUMENTS

2007/0069867 A1    3/2007  Fleisch et al.
2007/0285268 A1*  12/2007  Henze et al. .................. 340/667
2008/0142347 A1*   6/2008  Lewis et al. ................... 200/181
2008/0257706 A1*  10/2008  Haag ............................. 200/600

OTHER PUBLICATIONS

NeWave Sensor Solutions, http://newavesensors.com/products/smartshelf, dated 2012, 5 pages.
Datalogic, http://www.evoretail.com/technology/custom.html, printed Feb. 5, 2013, 2 pages.

* cited by examiner

| OR Array | AND Array | Result | Meaning |
|---|---|---|---|
| Not asserted | Not asserted | No switch closed | Zone empty |
| Asserted | Not asserted | At least 1 switch closed | Some presence |
| Not asserted | Asserted | Impossible | |
| Asserted | Asserted | All switches closed | Zone full |

Figure 3E

WIDE-AREA PRESSURE SENSOR WITH REDUCED POWER CONSUMPTION

BACKGROUND OF THE INVENTION

1. Field of the Invention

The specification relates to systems and methods for detecting pressure. In particular, the specification relates to systems and methods for implementing a wide-area sensor to detect pressure with reduced power consumption.

2. Description of the Background Art

Various types of sensors can be used to detect pressure on a surface including air pressure, resistive touch screens, micro-electro-mechanical system (MEMS) devices, strain gauges and membrane switches. A membrane switch is closed when pressure is applied to the switch. A membrane switch is open when pressure is released from the switch. These types of membrane switches are inexpensive and have a high reliability of usage (e.g., one million presses in a switch's life time).

Membrane switches are commonly used in keyboards. Applications of membrane switches in areas larger than keyboards include determining the mass of a person sitting in a car seat, and implementing a wide-area mat placed beneath a mattress, which can be used to detect if a person is lying on the mattress or not, etc. In these cases, the number of membrane switches included in the application is only a few but the application area is large. However, for applications using more membrane switches in a wide application area, high cost and high power consumption issues arise when connecting the membrane switches to a microcontroller that detects whether the membrane switches are closed or open.

For example, for a sensor with 18 rows×18 columns of membrane switches (e.g., 324 membrane switches in total), there are 36 signal lines required to connect to the microcontroller. A microcontroller having at least 36 general purpose input/output (GPIO) pins to satisfy this requirement (e.g., a microcontroller with 48 pins or 64 pins) can be very expensive. Furthermore, the only way to determine which switches are closed or open is to energize each row in turn and read each column for the row until all the rows are read, which is similar to traversing all the membrane switches one by one. It is time-consuming to read all the membrane switches in this approach. In an ultra-low power system, the amount of time taken to read all the membrane switches is a large power consumption penalty.

SUMMARY OF THE INVENTION

The system overcomes the deficiencies of the prior art with systems and methods for implementing a wide-area pressure sensor with reduced power consumption. In one embodiment, the system includes: a first layer printed with conductive ink in a first pattern that includes a first portion of an AND array and a first portion of an OR array; a second layer printed with conductive ink in a second pattern that includes a second portion of the AND array and a second portion of the OR array; and a separation barrier that goes between the first layer and the second layer. The separation barrier is contoured to configure the AND array and the OR array in each layer to make contact in designated areas responsive to pressure. The combination of the first layer, the second layer and the separation barrier creates a switch.

In one embodiment, a method for processing data received from a wide-area pressure sensor includes: receiving data from a switch array that includes an AND array and an OR array in a zone; determining whether the AND array and the OR array are asserted or not asserted based on the received data; and determining a detection result associated with the AND array and the OR array based on the determination of whether the AND array and the OR array are asserted or not asserted.

Other aspects include corresponding methods, systems, apparatuses, and computer program products for these and other innovative aspects.

The system is particularly advantageous in numerous respects. First, the system is capable of embedding functional intelligence into a switch array with no requirement of any interpretation by a controller. For example, the switch array includes an AND array and an OR array in each zone. In other examples, the switch array can include arrays of other logic types (e.g., NOT, XOR, XNOR, or a combination of any of these, etc.).

Second, multiple types of detection results can be determined per zone for the switch array. For example, each zone can be determined to be full, empty or having the presence of at least one item.

Third, the switch array reduces the number of conductive signals needed to connect to a microcontroller with minimal resolution loss. This is beneficial because it reduces the cost of the sheets used to make the switch array, the cost of the connectors and the cost of the microcontroller since less pins are required in the microcontroller.

Fourth, the system is applicable in a wide area with a plurality of switches for a pressure sensitive application.

Fifth, the system is capable of reducing the time to read the switch array, and saving read-time energy consumption for a power constrained system without adding complexity to the system. For example, the system only reads, for each zone, a single read for the AND array and another single read for the OR array.

Sixth, the switch array is interrupt-driven, which can save power consumption. For example, the microcontroller can be asleep in a low power mode when there is no status change in the switch array. The microcontroller wakes up to read the status of the switch array in response to state change in the array which generates an interrupt signal.

BRIEF DESCRIPTION OF THE DRAWINGS

The invention is illustrated by way of example, and not by way of limitation in the figures of the accompanying drawings in which like reference numerals are used to refer to similar elements.

FIG. 3E is a graphic representation of one embodiment of a detection table.

DETAILED DESCRIPTION OF THE PREFERRED EMBODIMENTS

Figure 1:
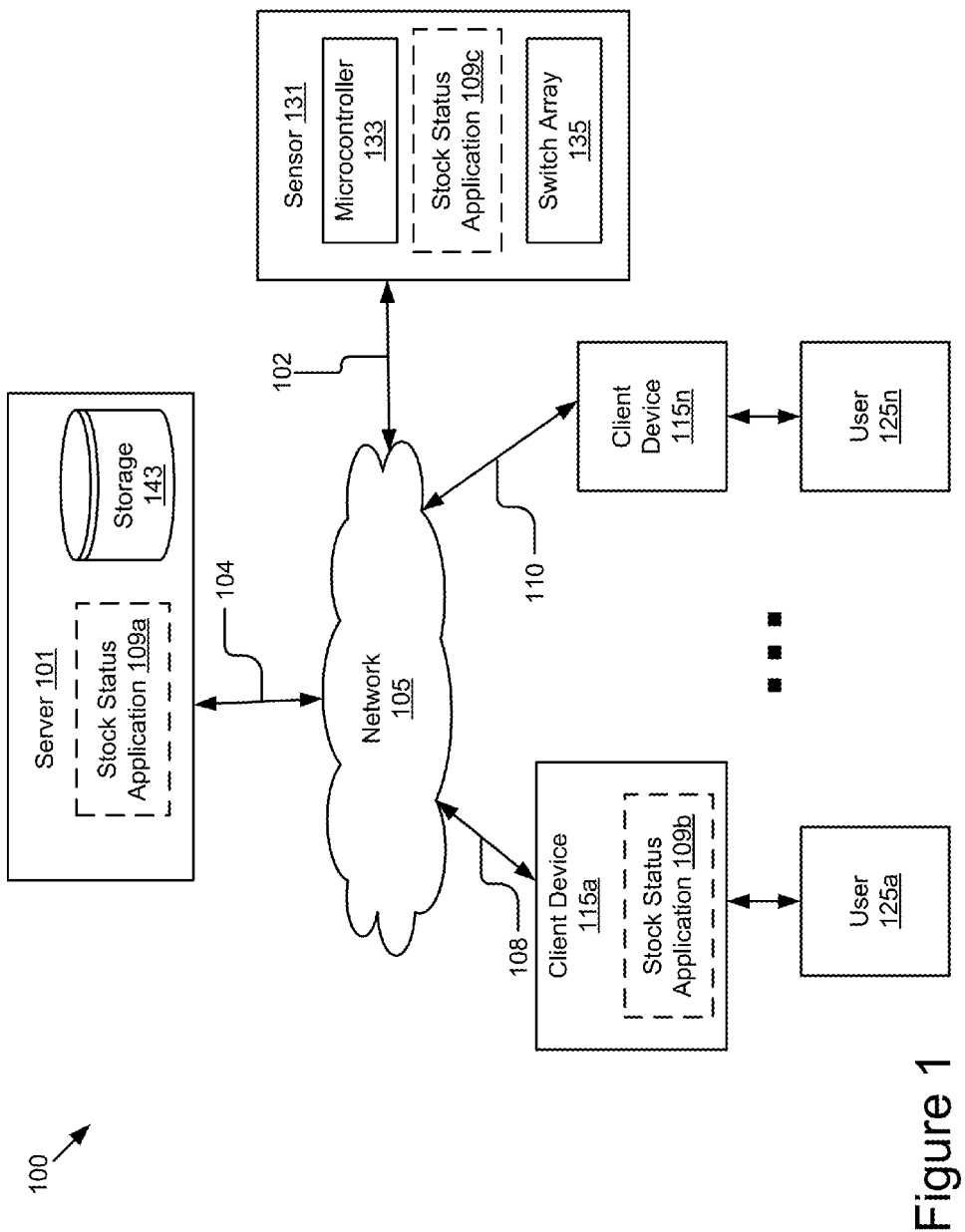
FIG. 1 is a high-level block diagram illustrating one embodiment of a system for implementing a wide-area pressure sensor with reduced power consumption.

A system and method for implementing a wide-area pressure sensor with reduced power consumption are described below. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to client devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for implementing a wide-area pressure sensor with reduced power consumption according to one embodiment. The illustrated system 100 includes client devices 115a . . . 115n that can be accessed by users 125a . . . 125n, a server 101 and a sensor 131. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115, the server 101 and the sensor 131, in practice one or more networks 105 can be connected to these entities.

In one embodiment, the stock status application 109a may be operable on the server 101, which is coupled to the network 105 via signal line 104. The signal line 104 may represent a wired or wireless communication path. The server 101 can be a hardware server that includes a processor, a memory and network communication capabilities. In some embodiments, the server 101 sends and receives data to and from one or more of the client devices 115a, 115n and the sensor 131 via the network 105. While FIG. 1 includes one server 101, the system 100 may include one or more servers 101. The server 101 also includes a storage device 143, which is described below in more detail with reference to FIG. 2.

In another embodiment, the stock status application 109b may be stored on a client device 115a, which is connected to the network 105 via signal line 108. The signal line 108 may represent a wired or wireless communication path. In some embodiments, the client device 115a, 115n may be a computing device that includes a memory and a processor, for example a laptop computer, a desktop computer, a tablet computer, a mobile telephone, a personal digital assistant (PDA), a mobile email device or other electronic device capable of accessing a network 105. In the illustrated embodiments, the user 125a interacts with the client device 115a. The client device 115n is communicatively coupled to the network 105 via signal line 110, which may be a wired or wireless communication path. The user 125n interacts with the client device 115n. In some embodiments, the stock status application 109b acts in part as a thin-client application that may be stored on the client device 115a, 115n and in part as components that may be stored on the sensor 131 or the server 101. For example, the server 101 stores data describing a stock history on a shelf (e.g., a store shelf, book shelf, inventory shelf, etc.) in the storage device 143. The stock status application 109b sends instructions to a browser (not shown) for displaying the stock history to the user 125a on the client device 115a. The client devices 115a, 115n in FIG. 1 are used by way of example. While FIG. 1 illustrates two client devices 115a and 115n, the present disclosure applies to a system architecture having one or more client devices 115.

Figure 4A:
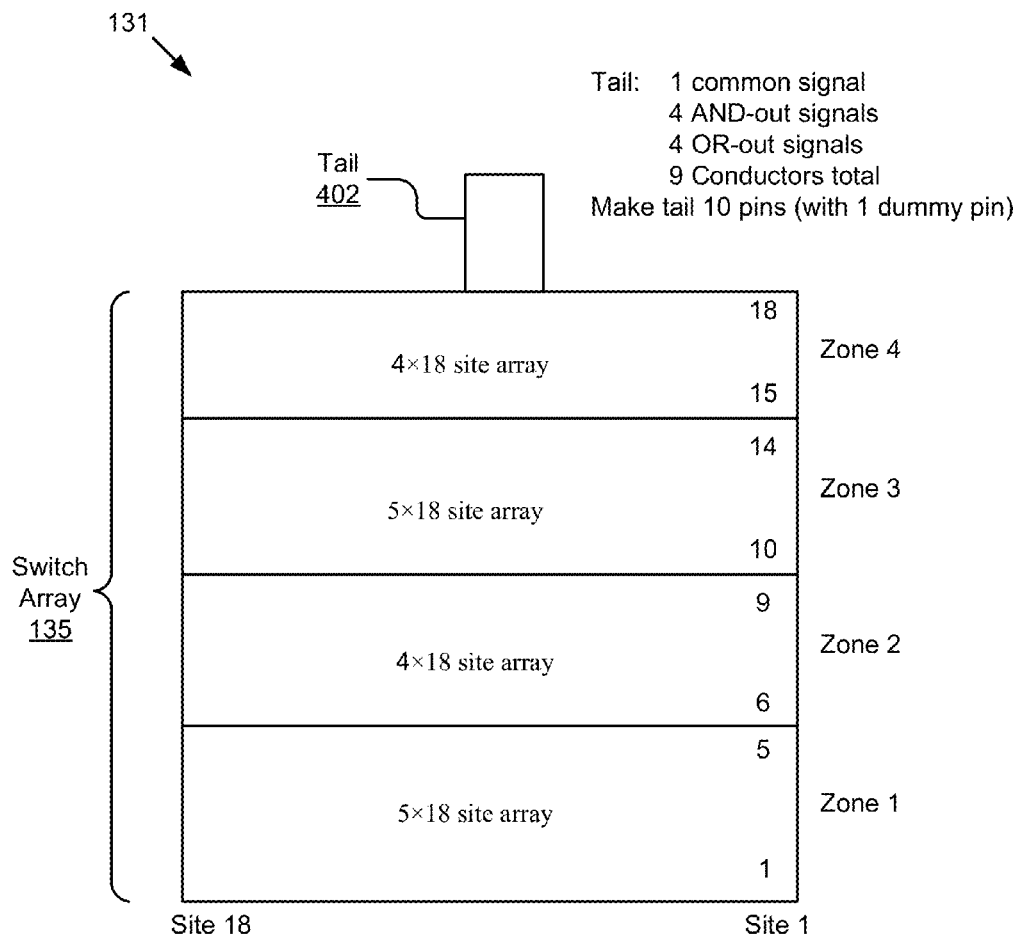
FIG. 4A is a graphic representation of one embodiment of a wide-area pressure sensor with reduced power consumption.

In yet another embodiment, the stock status application 109c may be operable on the sensor 131, which is coupled to the network 105 via signal line 102. The signal line 102 may represent a wired or wireless communication connection that connects the sensor 131 to the network 105. The sensor 131 can be a device that is capable of sensing pressure. For example, the sensor 131 is a wide-area pressure sensor having a dimension of 20 inches×20 inches. In other examples, the sensor 131 may have various different dimensions (e.g., 20 inches×10 inches). An example sensor 131 is illustrated in FIG. 4A. The sensor 131 sends and receives data to and from other entities of the system 100 via the network 105. For example, the sensor 131 sends and receives data to and from the client device 115 and the server 101. While FIG. 1 includes one sensor 131, the system 100 may include one or more sensors 131.

In one embodiment, the sensor 131 is placed on a shelf, and items on the shelf are placed on top of the sensor 131 so that the sensor 131 is configured to detect presence of the items as described below in more detail with reference to FIG. 2. The sensor 131 can be configured to receive electrical power from any source known in the art. In one embodiment, the sensor 131 is connected to wires for price tags and/or wires for lights in a shelf, where the wires are coupled to supply power to the sensor 131. In one embodiment, the sensor 131 includes a microcontroller 133 and a switch array 135. In another embodiment, the microcontroller 133 is not included in the sensor 131, and the sensor 131 communicates with the microcontroller 133 via a wired connection or a wireless communication link.

The microcontroller 133 is a computing device implemented on a single integrated circuit that includes a processor, a memory and one or more programmable input/output peripherals. In some embodiments, the microcontroller 133 includes one or more embedded memories (e.g., a static random access memory (SRAM), an electrically erasable programmable read-only memory (EEPROM), a flash memory, etc.). In some examples, the microcontroller 133 includes one or more general purpose input/output (GPIO) pins, each configurable to either an input state or an output state. For example, a first GPIO pin in the microcontroller 133 can be configured to an output state, which acts as a common signal to drive the switch array 135; a second GPIO pin can be configured to an input state, which reads an OR-out signal from the switch array 135; and a third GPIO pin can be configured to an input state, which reads an AND-out signal from the switch array 135. The switch array 135, the common signal, the OR-out signal and the AND-out signal are described below in more detail. The microcontroller 133 may include other components for providing the functionality described herein.

The switch array 135 is an array including one or more switches. For example, a switch array 135 is a membrane switch array that includes one or more membrane switches. In some embodiments, the switch array 135 is divided into one or more zones, with each zone including an AND array, an OR array, a common signal as an input signal, an AND-out signal as a first output signal and an OR-out signal as a second output signal. The symbol AND represents a logical conjunction.

The symbol OR represents a logical disjunction. An OR array is an array including one or more OR switches. An OR-out signal is a signal outputted from the OR array. An AND array is an array including one or more AND switches. An AND-out signal is a signal outputted from the AND array. A common signal is a source signal used to determine status of signals outputted from the switch array 135. For example, the common signal is a low-current low-power signal. It can be sourced continuously, or sourced only when the state of the switches needs to be determined. In one embodiment, each zone has a separate common signal. In another embodiment, all the zones share a single common signal. The switch array 135, OR array, OR switch, AND array, AND switch, common signal, AND-out signal and OR-out signal are described below in more detail with reference to FIGS. 3B-3D, 4A-4B and 5A-5B.

The stock status application 109 can be code and routines for determining a stock status on the shelf. In some embodiments, the stock status application 109 can be implemented using hardware including a field-programmable gate array (FPGA) or an application-specific integrated circuit (ASIC). In some other embodiments, the stock status application 109 can be implemented using a combination of hardware and software. In some embodiments, the stock status application 109 may be stored in a combination of the devices and servers, or in one of the devices or servers. In some embodiments, the stock status application 109 is stored in a memory embedded within the microcontroller 133.

In one embodiment, the stock status application 109 receives data from the switch array 135 and determines whether an OR array and an AND array in each zone of the switch array 135 are asserted or not asserted respectively. The stock status application 109 determines a detection result associated with the OR array and the AND array in each zone. For example, the stock status application 109 determines a stock status in each zone (e.g., zones 1 and 2 have full stock, zones 3 and 4 have empty stock, etc.). Optionally, the stock status application 109 sends a notification to the server 101 or the client device 105 based on the stock status in each zone. The stock status application 109 is described below in more detail with reference to FIGS. 2 and 6-7.

Stock Status Application

Figure 2:
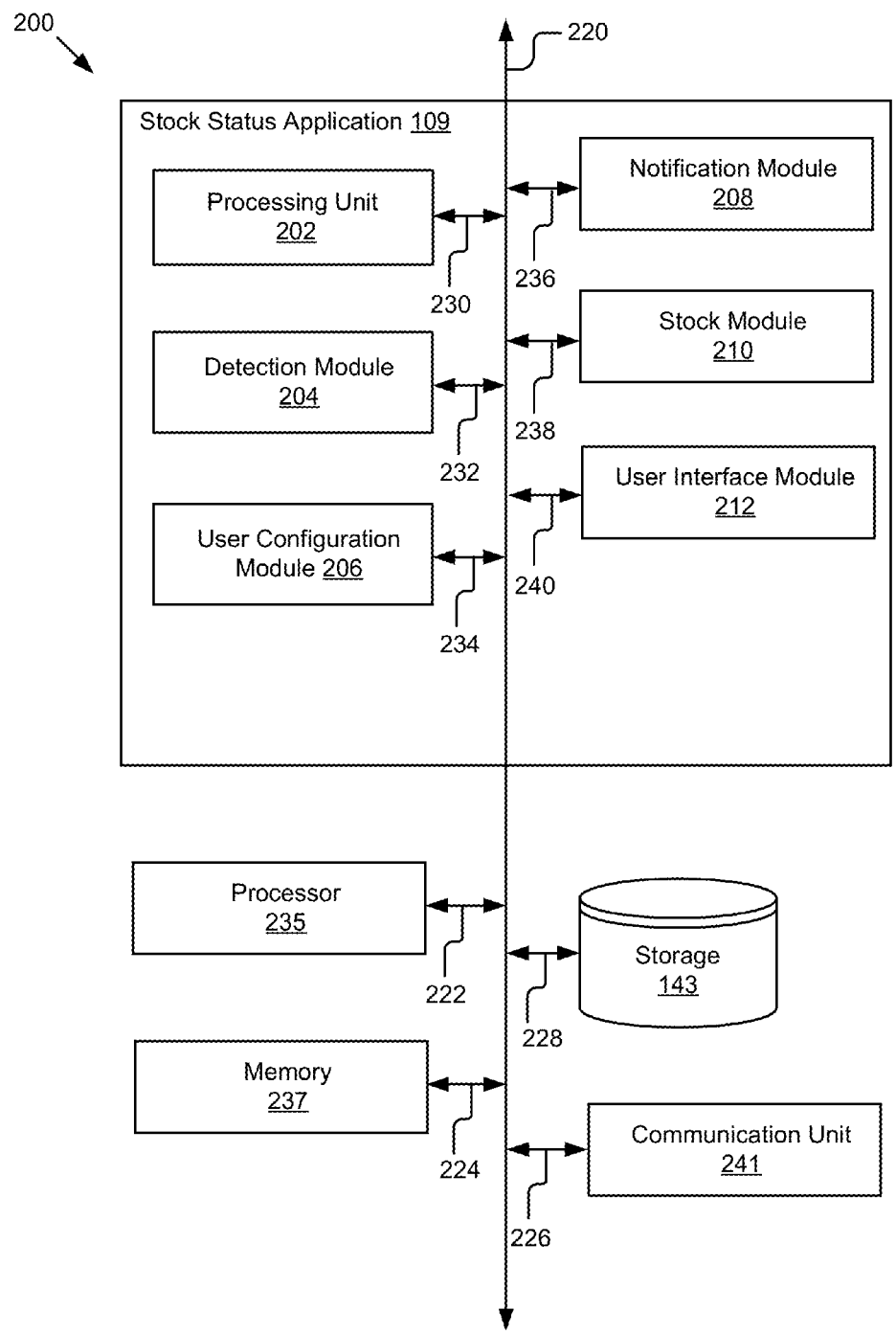
FIG. 2 is a block diagram illustrating one embodiment of a stock status application.

Referring now to FIG. 2, an example of the stock status application 109 is shown in more detail. FIG. 2 is a block diagram of a computing device 200 that includes a stock status application 109, a processor 235, a memory 237 and a communication unit 241 according to some examples. In some embodiments, the computing device 200 additionally includes a storage device 143. The components of the computing device 200 are communicatively coupled by a bus 220. In some embodiments, the computing device 200 can be one of a client device 115, a server 101 and a sensor 131, or the functional components can be distributed between the client device 115, a server 101, and a sensor 131.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the client device 115, the sensor 131 and the server 101 depending upon where the stock status application 109 is stored. The communication unit 241 is coupled to the bus 220 via signal line 226. In some embodiments, the communication unit 241 includes a port for direct physical connection to the network 105 or to another communication channel. For example, the communication unit 241 includes a USB, SD, CAT-5 or similar port for wired communication with the client device 115. In some embodiments, the communication unit 241 includes a wireless transceiver for exchanging data with the client device 115 or other communication channels using one or more wireless communication methods, including IEEE 802.11, IEEE 802.16, BLUETOOTH® or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 143 can be a non-transitory memory that stores data for providing the functionality described herein. The storage device 143 may be a dynamic random access memory (DRAM) device, a static random access memory (SRAM) device, flash memory or some other memory devices. In some embodiments, the storage device 143 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 143 is communicatively coupled to the bus 220 via signal line 228. In one embodiment, the storage device 143 stores one or more of configuration data describing a stock setting of a shelf configured by a user, data describing a detection table, a zone identifier (ID) identifying a zone in a shelf, a detection result in a zone identified by the zone ID and a notification (or multiple notifications) generated based on the detection result, etc. The stock setting, the detection table and the detection result are described below in more detail. In some embodiments, the storage device 143 may store other data for providing the functionality described herein.

In the illustrated embodiment shown in FIG. 2, the stock status application 109 includes a processing unit 202, a detection module 204, a user configuration module 206, a notification module 208, a stock module 210 and a user interface module 212. The components of the stock status application 109 are communicatively coupled via the bus 220.

The processing unit 202 can be software including routines for handling communications between the stock status application 109 and other components of the computing device 200. In one embodiment, the processing unit 202 can be a set of instructions executable by the processor 235 to provide the functionality described below for handling communications between the stock status application 109 and other components of the computing device 200. In another embodiment, the processing unit 202 can be stored in the memory 237 of the computing device 200 and can be accessible and executable by the processor 235. In either embodiment, the processing unit 202 can be adapted for cooperation and communication with the processor 235 and other components of the computing device 200 via signal line 230.

In one embodiment, the processing unit 202 sends and receives data, via the communication unit 241, to and from one or more of a client device 115, a server 101 and a sensor 131. For example, the processing unit 202 receives, via the communication unit 241, configuration data for configuring a stock setting of a shelf from a client device 115 operated by a user and sends the configuration data to the user configuration module 206. In another example, the processing unit 202 receives graphical data for providing a user interface to a user from the user interface module 212 and sends the graphical data to a client device 115, causing the client device 115 to present the user interface to the user.

In one embodiment, the processing unit 202 receives data from components of the stock status application 109 and stores the data in the storage device 143. For example, the processing unit 202 receives data describing a detection result from the detection module 204 and stores the data in the storage device 143. In another embodiment, the processing unit 202 retrieves data from the storage device 143 and sends the data to components of the stock status application 109. For example, the processing unit 202 retrieves data describing a detection table from the storage device 143 and sends the retrieved data to the detection module 204.

The detection module 204 can be software including routines for determining a detection result. In one embodiment, the detection module 204 can be a set of instructions executable by the processor 235 to provide the functionality described below for determining a detection result. In another embodiment, the detection module 204 can be stored in the memory 237 of the computing device 200 and can be accessible and executable by the processor 235. In either embodiment, the detection module 204 can be adapted for cooperation and communication with the processor 235 and other components of the computing device 200 via signal line 232.

In one embodiment, the microcontroller 133 determines an occurrence of an interruption caused by the switch array 135. For example, the microcontroller 133 determines that a status of an AND-out signal and/or an OR-out signal outputted from the switch array 135 has been changed, and generates an interrupt signal in order to read all the AND-out signals and the OR-out signals from the switch array 135. The change of the status of an AND-out signal and/or an OR-out signal in the switch array 135 indicates a change of a stock status on a shelf where the sensor 131 is placed (e.g., items placed on top of the sensor 131 being removed or new items being placed on the top of the sensor 131, etc.). In another embodiment, the microcontroller 133 generates an interrupt signal response to an interrupt request from a timer. For example, a user can set up a time in a timer, causing the timer to generate and send a reading interrupt request to the microcontroller 133 when it is time to read data from the switch array 135. In yet another embodiment, the microcontroller 133 generates an interrupt signal at one or more predetermined polling times configured by a user. In other embodiments, the detection module 204 can determine an occurrence of an interruption and generate an interrupt signal by performing operations similar to those described above. The detection module 204 then sends the interrupt signal to the microcontroller 133.

Responsive to the interrupt signal, the microcontroller 133 activates the common signal in the switch array 135 using a low-current, low-power signal outputted to the switch array 135. The microcontroller 133 reads a status of an AND-out signal and a status of an OR-out signal from each zone of the switch array 135. The status of the AND-out signal indicates whether the AND array in the zone is asserted or not asserted. For example, the status of the AND-out signal indicates whether pressure is applied to all the AND switches in the AND array or not. The status of the OR-out signal indicates whether the OR array in the zone is asserted or not asserted. For example, the status of the OR-out signal indicates whether pressure is applied to at least one OR switch in the OR array. In some embodiments, the microcontroller 133 sends data describing the status of the AND-out signal and the status of the OR-out signal in each zone of the switch array 135 to the detection module 204. In some other embodiments, the detection module 204 receives the data describing the status of the AND-out signal and the status of the OR-out signal in each zone from the switch array 135.

For each zone, the detection module 204 determines whether the OR array and the AND array are asserted or not asserted based on the AND-out signal and the OR-out signal from the zone. For example, if the AND-out signal is asserted, the detection module 204 determines the AND array is asserted; if the AND-out signal is not asserted, the detection module 204 determines the AND array is not asserted; if the OR-out signal is asserted, the detection module 204 determines the OR array is asserted; and if the OR-out signal is not asserted, the detection module 204 determines the OR array is not asserted.

The detection module 204 determines a detection result associated with the OR array and the AND array in each zone. For example, the detection module 204 determines a detection result for each zone according to a detection table. An example detection table is illustrated in FIG. 3E. For example, if both the OR array and the AND array in a zone are not asserted, the detection module 204 determines that no switch in the zone is closed, indicating a stock status for the zone is empty; if both the OR array and the AND array in the zone are asserted, the detection module 204 determines that all the switches in the zone are closed responsive to pressure, indicating a stock status for the zone is full; and if the OR array in the zone is asserted and the AND array in the zone is not asserted, the detection module 204 determines that at least one switch in the zone is closed responsive to pressure, indicating a stock status for the zone as having presence of at least one item but it is not completely full.

Responsive to the detection result of having presence of at least one item in the zone, the detection module 204 can determine a ratio between the item size and the zone size even though the exact location of the at least one item placed on the surface cannot be determined. This is beneficial since, for example, the ratio provides a simple low-cost, low-power solution to determine how much of a surface in the zone is covered by the at least one item. The Notification Module 208 may use different ratios, based on different product sizes, to determine the urgency of the notification that is sent.

In one embodiment, the detection result for a zone includes one or more of a zone ID that identifies the zone, a switch closure status in the zone (e.g., no switch in the zone being closed, at least one switch in the zone being closed, or, all the switches in the zone being closed, etc.), a stock status in the zone (e.g., the stock status is full, the stock status is empty, one or more items are in stock (this can be characterized as having the presence of at least one item in the zone but it is not full), etc.) and an item ID that identifies the item placed on the shelf, etc. In other embodiments, the detection result may include other data associated with the zone. The detection result may also include other data describing the zone and/or items present in the zone.

In one embodiment, the detection module 204 sends result data describing the detection result in each zone to one or more of the notification module 208, the stock module 210, the microcontroller 133, the server 101 and the client device 115. In another embodiment, the detection module 204 stores the result data in the storage 143.

The user configuration module 206 can be software including routines for configuring a stock setting associated with a shelf. In one embodiment, the user configuration module 206 can be a set of instructions executable by the processor 235 to provide the functionality described below for configuring a stock setting associated with a shelf. In another embodiment, the user configuration module 206 can be stored in the memory 237 of the computing device 200 and can be accessible and executable by the processor 235. In either embodiment, the user configuration module 206 can be adapted for cooperation and communication with the processor 235 and other components of the computing device 200 via signal line 234.

In one embodiment, the user configuration module 206 receives configuration data from a user and configures a stock setting for a shelf using the configuration data. A stock setting is data describing the configuration for a stock of items on a shelf. The user can specify a preference for a stock status of a shelf via the stock setting. For example, a user can select a preference to maintain the shelf to be full, empty or having the presence of at least one item. If the user chooses to keep the shelf full, the notification module 208 transmits a notification notifying the user to restock the shelf when the stock module 210 determines that the overall stock status of the shelf is not full. If the user chooses to keep the shelf having the presence of at least one item, the notification module 208 transmits a notification notifying the user to restock the shelf when the stock module 210 determines that the overall stock status of the shelf is empty.

In one embodiment, the user configuration module 206 configures a stock setting to restock the shelf if a predetermined number of zones (e.g., half of the zones) in the switch array 135 are empty. The predetermined number of zones is configurable by a user. Responsive to this stock setting, the notification module 208 transmits a notification notifying the user to restock the shelf if at least the predetermined number of zones is empty. In another embodiment, the user configuration module 206 configures a stock setting for a shelf based on items placed on the shelf. For example, if a shelf holds a fast-selling item, the user configuration module 206 configures to restock the shelf if a first predetermined number of zones (e.g., 50% of the zones) in the switch array 135 are empty; however, if the shelf holds a slow-selling item, the user configuration module 206 configures to restock the shelf if a second predetermined number of zones (e.g., 90% of the zones) in the switch array 135 are empty. Other examples of user configurations are possible.

In one embodiment, the user configuration module 206 sends data describing the stock setting for the shelf to one or more of the notification module 208 and the stock module 210. In another embodiment, the user configuration module 206 stores data describing the stock setting in the storage 143.

The notification module 208 can be software including routines for providing notifications. In one embodiment, the notification module 208 can be a set of instructions executable by the processor 235 to provide the functionality described below for providing notifications. In another embodiment, the notification module 208 can be stored in the memory 237 of the computing device 200 and can be accessible and executable by the processor 235. In either embodiment, the notification module 208 can be adapted for cooperation and communication with the processor 235 and other components of the computing device 200 via signal line 236.

In one embodiment, the notification module 208 receives one or more detection results for one or more zones from the detection module 204. The one or more detection results include one or more zone IDs identifying one or more zones on a shelf, a switch closure status for each zone, a stock status for each zone and an item ID that identifies an item placed on the shelf. The notification module 208 transmits a notification that includes the one or more detection results to one or more of the server 101 and the client device 115.

In another embodiment, the notification module 208 receives data describing an overall stock status of a shelf from the stock module 210 and transmits a notification including the overall stock status to one or more of the server 101 and the client device 115. An overall stock status of a shelf is data describing an overall stock on a shelf. For example, an overall stock status of a shelf indicates three out of four zones in the shelf are empty. In some embodiments, the notification module 208 transmits the notification to one or more of the server 101 and the client device 115 if the stock on the shelf is below a predetermined threshold. For example, the notification module 208 transmits the notification if more than 80% of the zones are empty. In some other embodiments, the notification module 208 may transmit the notification if the overall stock status indicates the shelf is completely empty.

In one embodiment, the notification module 208 determines an action associated with the detection results and/or the overall stock status, and transmits a notification to the server 101 or the client device 115 based on the determined action. For example, if an overall stock status of a shelf for a fast-selling item indicates that the shelf is out of stock, the notification module 208 determines to restock the shelf as soon as possible and sends an urgent restock notification to a user (e.g., a stock manager, a store manager, a stocking clerk, etc.). However, if an overall stock status of a shelf for a slow-selling item indicates that at least one zone on the shelf is full, the notification module 208 determines not to restock the shelf and does not send the restock notification to the user. A restock notification is a notification informing a user to restock a shelf.

In one embodiment, the notification module 208 determines the action based on a stock setting associated with a shelf. For example, one stock setting specifies that if at least 70% of the zones on the shelf are empty, the notification module 208 notifies a user to restock the shelf. According to another stock setting, the notification module 208 notifies the user to restock the shelf if the overall stock status indicates 75% of the zones are empty, and determines not to send a restock notification to the user if the overall stock status indicates that only 50% of the zones are empty.

The stock module 210 can be software including routines for determining an overall stock status on a shelf. In one embodiment, the stock module 210 can be a set of instructions executable by the processor 235 to provide the functionality described below for determining an overall stock status on a shelf. In another embodiment, the stock module 210 can be stored in the memory 237 of the computing device 200 and can be accessible and executable by the processor 235. In either embodiment, the stock module 210 can be adapted for cooperation and communication with the processor 235 and other components of the computing device 200 via signal line 238.

In one embodiment, the stock module 210 receives data describing one or more detection results from the detection module 204. The one or more detection results include one or more stock statuses for one or more zones in the switch array 135. The stock module 210 determines an overall stock status for the shelf based on the one or more stock statuses associated with the one or more zones. For example, the stock module 210 determines that the shelf is empty if all the stock statuses for all the zones are empty. In another example, the stock module 210 determines the shelf is full if all the stock statuses for all the zones are full. In yet another example, the stock module 210 determines the shelf has presence of at least one item if at least one stock status of one zone has presence of at least one item, but it is not completely full. In some embodiments, an overall stock status describes one or more of a number of zones in the switch array 135 that are empty, a number of zones that are full and a number of zones that have presence of at least one item, etc.

In one embodiment, the stock module 210 determines a stock history for a shelf. For example, the stock module 210 records a stock history describing one or more of timestamps that identify the times when the shelf is restocked, how the overall stock status of the shelf changes over time, how frequently the shelf is restocked and which user restocks the shelf, etc. In other embodiments, the stock history may include other data associated with the stock on the shelf.

The user interface module 212 can be software including routines for generating graphical data for providing a user interface. In one embodiment, the user interface module 212 can be a set of instructions executable by the processor 235 to provide the functionality described below for generating graphical data for providing a user interface. In another embodiment, the user interface module 212 can be stored in the memory 237 of the computing device 200 and can be accessible and executable by the processor 235. In either embodiment, the user interface module 212 can be adapted for cooperation and communication with the processor 235 and other components of the computing device 200 via signal line 240. The user interface module can operate on server 101, client device 115, or sensor 131.

In one embodiment, the user interface module 212 generates graphical data for providing a user interface to a user. The user interface module 212 sends the graphical data to a client device 115, causing the client device 115 to present the user interface to the user. For example, the user interface module 212 generates graphical data for providing a user interface that depicts a notification. The user interface module 212 sends the graphical data to the client device 115, causing the client device 115 to present the notification to a user via the user interface. In other embodiments, the user interface module 212 may generate graphical data for providing other user interfaces to users.

As an example use of the stock status application 109, assume that a shelf where a sensor 131 having four zones (Zones 1-4) is placed is full of items. The AND array and the OR array in each of the four zones are asserted, indicating the overall stock status of the shelf is full. If one or more items in Zone 1 are removed, the AND array in Zone 1 changes from an asserted status to a not-asserted status while the OR array in Zone 1 is still asserted. The change of the status of the AND array in Zone 1 causes the microcontroller 133 to generate an interrupt signal and read the status of all the AND arrays and all the OR arrays in the four zones or optionally only in the zone which changes (Zone 1). The stock status application 109 determines the stock status for each zone and an overall stock status for the shelf. For example, the stock status application 109 determines that Zones 2-4 are full because their AND arrays and OR arrays are both asserted and Zone 1 has a stock status of having presence of at least one item because only the OR array is asserted. The stock status application 109 may generate a notification associated with the stock change on the shelf and sends the notification to a client device 115 or a server 101.

If all the items in Zone 1 are removed, the OR array in Zone 1 changes from an asserted status to a not-asserted status, which similarly causes the microcontroller 133 to generate an interrupt signal and read the status of all the AND arrays and all the OR arrays in the four zones or optionally only in Zone 1. Similarly, the stock status application 109 determines the stock status for each zone and the overall stock status for the shelf again. For example, the stock status application 109 determines that Zones 2-4 are full because their AND arrays and OR arrays are both asserted and Zone 1 is empty because both the OR array and the AND array in Zone 1 are not asserted. The stock status application 109 may also generate a notification and sends the notification to a client device 115 or a server 101.

Graphic Representations

Figure 3A:
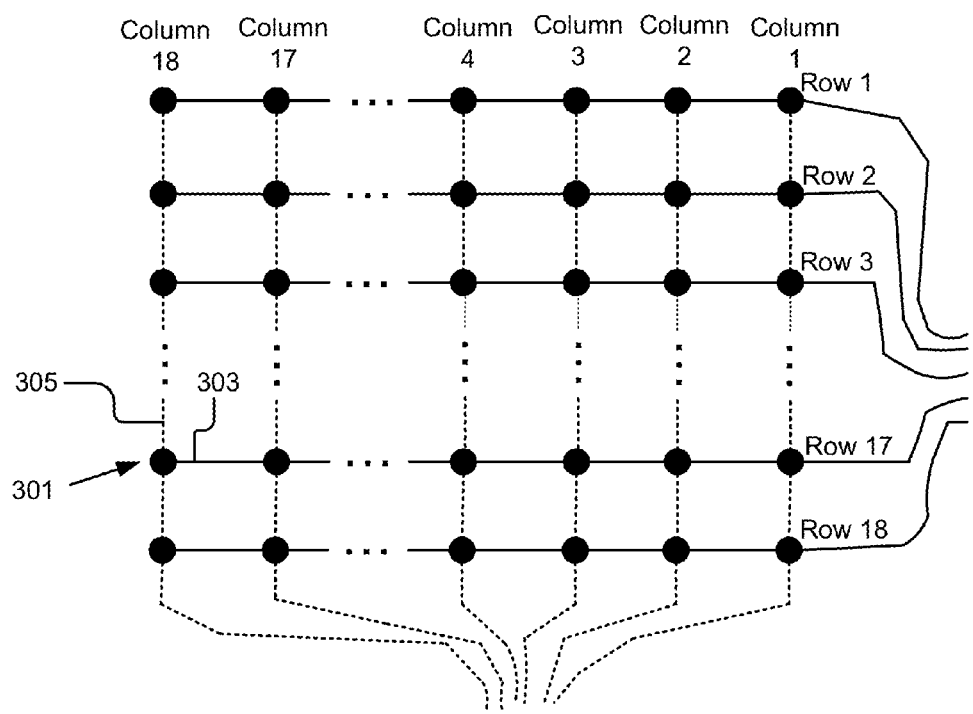
FIG. 3A is a graphic representation illustrating a traditional membrane switch implementation in prior art.

FIG. 3A is a graphic representation of one embodiment illustrating a traditional membrane switch implementation in prior art. The traditional membrane switch implementation is applied to detect pressure at certain locations on a surface. This traditional membrane switch implementation includes a first layer whose circuits are printed horizontally (illustrated as solid signal lines in FIG. 3A) and a second layer whose circuits are printed vertically (illustrated as dotted signal lines in FIG. 3A). Persons of ordinary skill in the art will recognize that when actually constructed, the vertical lines in this example would be continuous lines with no separation; they are shown with separation in this figure only to make the picture clearer to understand. A spacer is placed between the first layer and the second layer so that the signal lines in the first layer and the signal lines in the second layer can only make contact at the crossing points (illustrated as block dots in FIG. 3A) when pressure is applied. By way of example, assume that a small amount of electrical energy is sourced on to solid signal line 303. Because of the spacer, none of the horizontal circuits are in contact with the vertical circuits, so no current flows from signal line 303. However, when black dot 301 is squeezed, contact is made between signal line 303 to signal line 305. In this case, current will flow from signal 303 to signal 305, which means the switch is closed. When the pressure to 301 is released, the signals 303 and 305 no longer make contact and current stops flowing, which means the switch is open. Note that when dot 301 is squeezed, current only flows from signal 303 to 305; all other dots represent open switches, unless they, too, are squeezed. Each black dot area is referred to as a switch contact site where a switch (e.g., a membrane switch) is formed.

In the traditional membrane switch implementation, each switch contact site has a single switch contact point that forms a single membrane switch. A switch contact point is a location within a switch contact site where the first layer makes contact with the second layer in response to pressure. When pressure is applied to a membrane switch in a switch contact site, the membrane switch is closed; when the pressure is released from the switch contact site, the membrane switch is open.

When reading output data from the traditional membrane switch implementation, a microcontroller provides a current to activate each solid signal line in the first layer one at a time, and reads all the dotted signal lines in the second layer for each activated solid signal line in order to determine if any of the switches associated with the particular solid signal line is closed. The microcontroller repeats the same process for all the solid signal lines and reads all the dotted signal lines one by one for each solid signal line. This reading process is referred to as a polled process and is time-consuming. If all the solid signal lines are driven with current, it is possible that an interrupt could be generated via the dotted signal lines; however, the entire array must be read one row/column at a time to accurately determine which switch generated the interrupt. In an ultra-low-power system, the amount of time taken to traverse the array of switches one by one in a polled process is a large power consumption penalty.

As illustrated in FIG. 3A, this example of a traditional membrane switch embodiment has 18 solid signal lines and 18 dotted signal lines so that 18×18=324 membrane switches are formed to detect pressure. However, the traditional membrane switch implementation requires a large connector for signal interconnection and a large microcontroller (or external multiplexer) to read all the membrane switches, which is an expensive implementation. Also, the 18 solid signal lines and the 18 dotted signal lines indicate there are 36 signal lines connected to the microcontroller. In other words, the microcontroller needs to have at least 36 GPIO pins to connect to the traditional membrane switch implementation. Generally, a microcontroller with 48 pins or 64 pins that satisfies this requirement is more expensive than a 14 or 16 pin microcontroller.

Figure 3B:
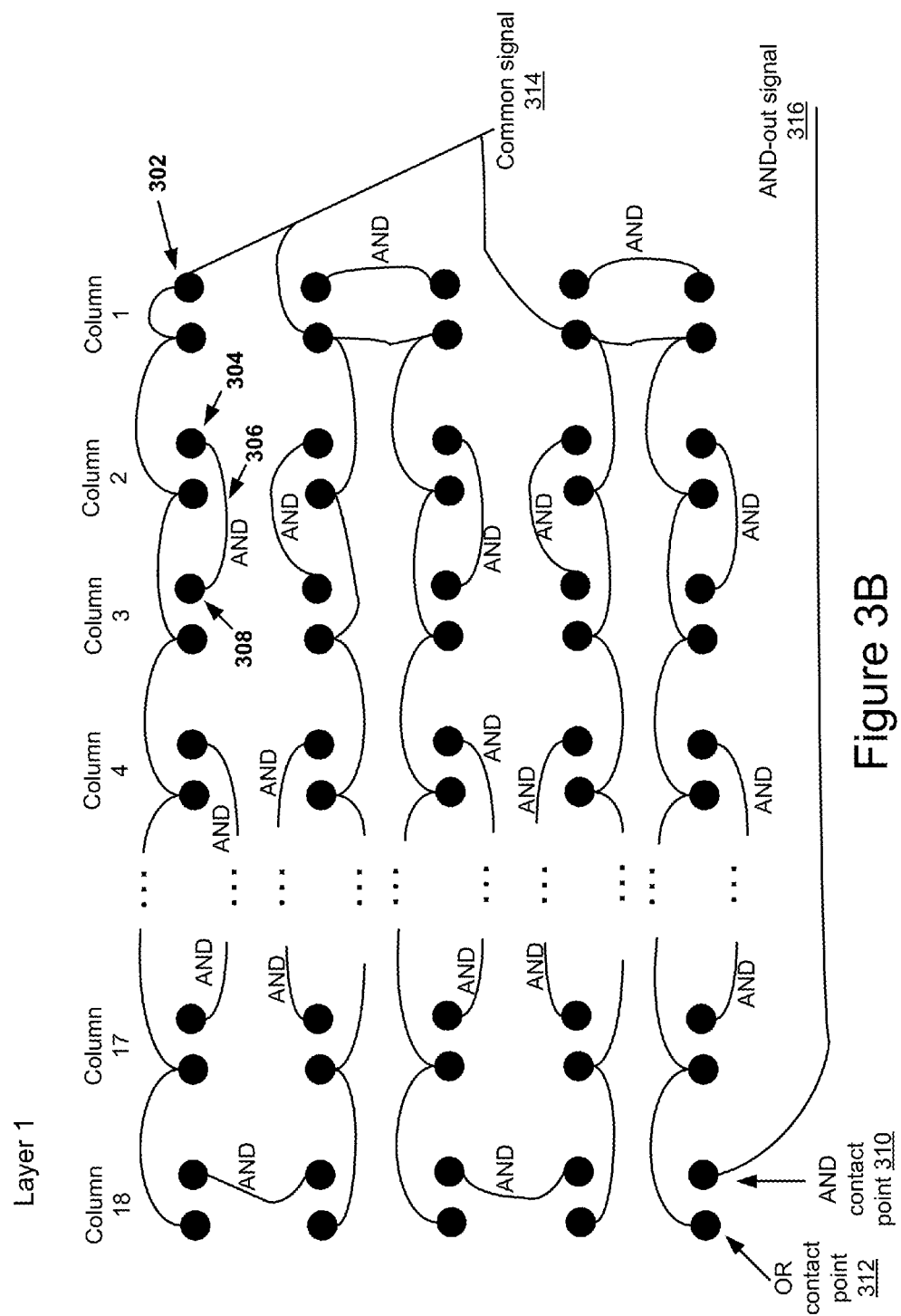
FIG. 3B is a graphic representation of one embodiment of a first layer in a zone of a switch array.
Figure 3C:
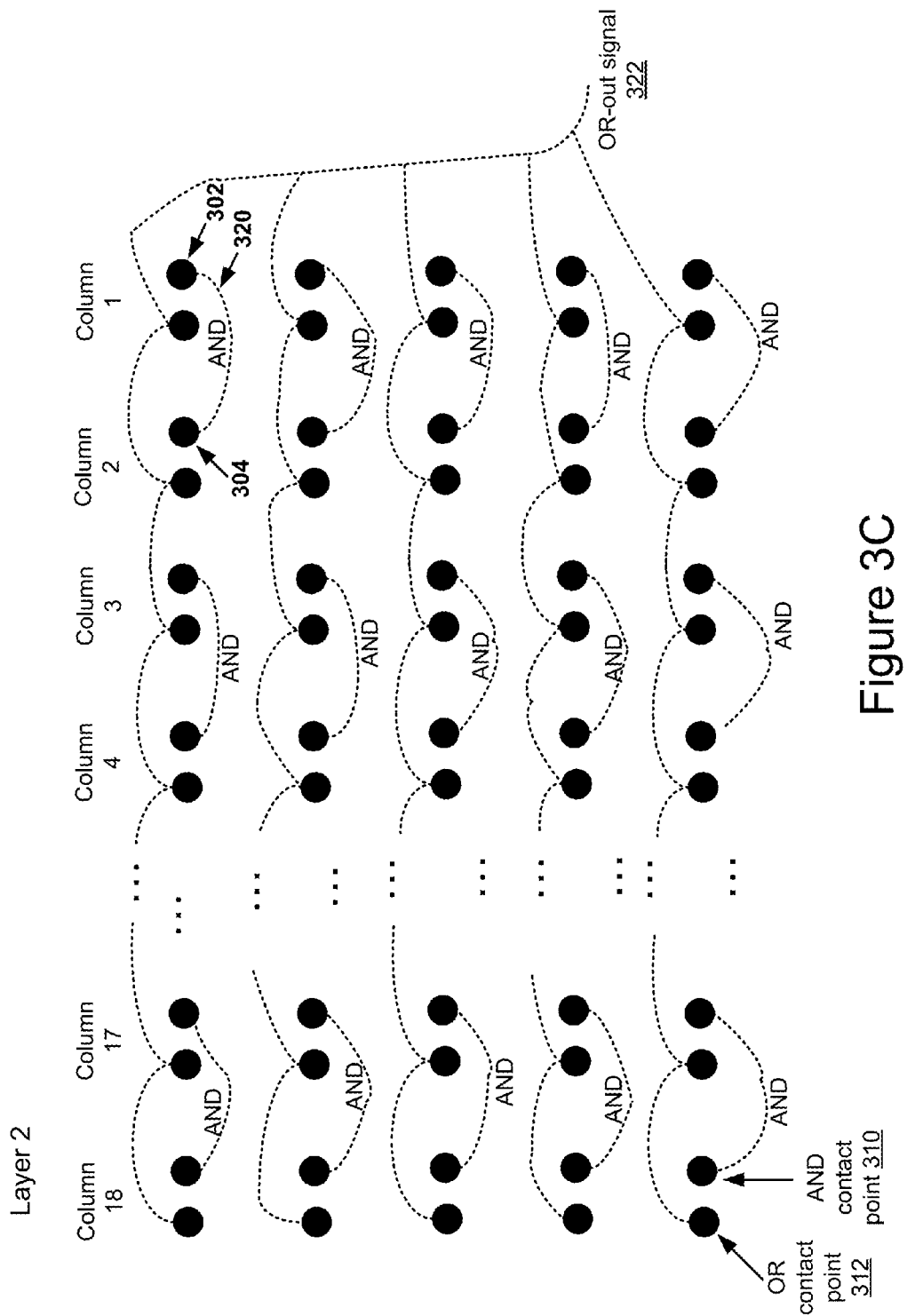
FIG. 3C is a graphic representation of one embodiment of a second layer in a zone of a switch array.
Figure 3D:
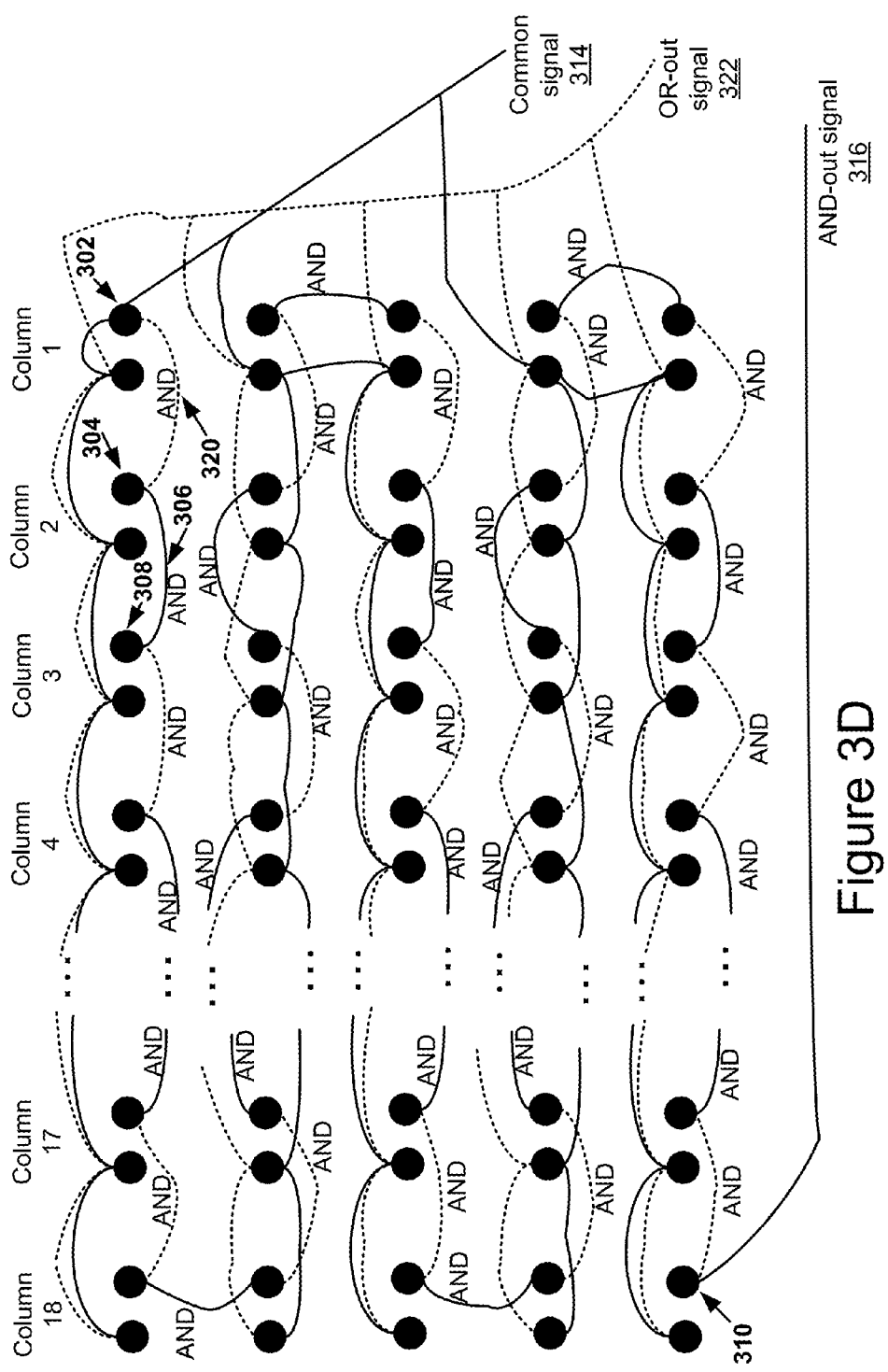
FIG. 3D is a graphic representation of one embodiment illustrating a combination of a first layer and a second layer in a zone of a switch array.

The example switch array 135 described with reference to FIGS. 3B-3D overcomes the deficiencies of the traditional membrane switch implementation, especially for large-area membrane switches. FIGS. 3B-3D depict an example embodiment of one zone (e.g., a zone with a size of 5 rows×18 columns) of the switch array 135 that includes a first layer, a second layer and a separation barrier going between the first layer and the second layer. Specifically, FIG. 3B illustrates an example first layer of the switch array 135, FIG. 3C illustrates an example second layer of the switch array 135 and FIG. 3D illustrates an example combination of the first layer and the second layer.

A separation barrier is a layer that isolates the first layer from the second layer. For example, the separation barrier can be a separating sheet with openings in the location of the switches. Or a separation barrier can be made from multiple spacer points (e.g., ultraviolet (UV) cured points) that separate the first layer from the second layer. In one embodiment, the density for the spacer points in each pattern is from one spacer point every 2 millimeters to one spacer point every 20 millimeters. For example, if the pressure is very great, there may be a need for denser spacer dots (every 2 mm). But if the pressure is very weak, there may be a need for less dense spacer dots (every 20 mm). In one embodiment, no spacer point is placed within a switch contact site. In another embodiment, one or more spacer points may be placed within a switch contact site. Spacer dots in a switch can help improve switch reliability.

In one embodiment, the separation barrier is contoured so that the AND and OR arrays in each layer can only make contact in designated areas (e.g., switch contact points in switch contact sites) when pressure is applied to the switch array 135. When the pressure is released, the separation barrier separates the AND and OR arrays in each layer. In one embodiment, the separation barrier is an independent layer from the first layer and the second layer. In another embodiment, the separation barrier is part of the first layer. In yet another embodiment, the separation barrier is part of the second layer.

Figure 3F:
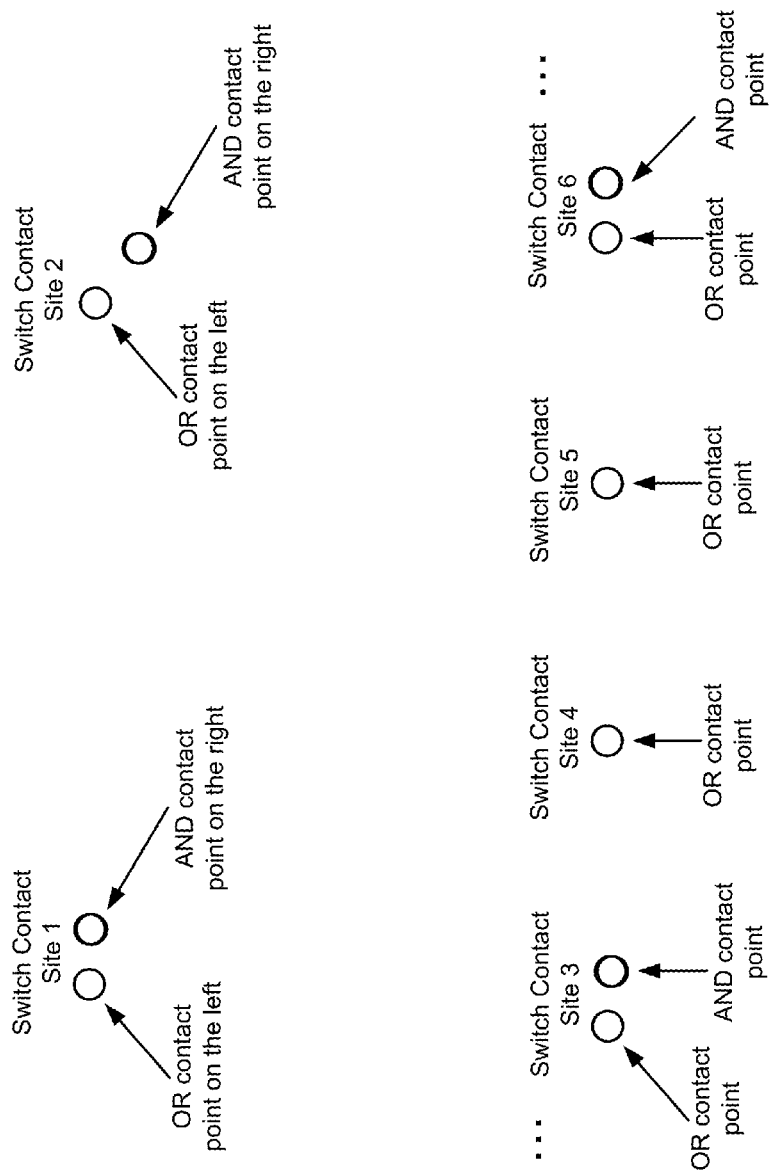
FIG. 3F is a graphic representation of various embodiments of a switch contact site.

Different from the switch contact sites shown in FIG. 3A, each switch contact site in the switch array 135 shown in FIGS. 3B-3D has two switch contact points, an OR contact point that joins an OR array and an AND contact point that joins an AND array. Example switch contact sites in a switch array 135 are illustrated in FIG. 3F. In FIGS. 3B-3D, an OR contact point is represented as a block dot on the left in a switch contact site (e.g., an OR contact point 312 shown in FIG. 3B) and an AND contact point is represented as a block dot on the right in the switch contact site (e.g., an AND contact point 310 shown in FIG. 3B).

The combination of the first layer, the separation barrier and the second layer creates a switch at each switch contact point. For example, an OR switch is formed at each OR contact point, and an AND switch is formed at each AND contact point. In the illustrated embodiment, each switch contact site has an OR switch and an AND switch. In other embodiments, a switch contact site may only have an OR switch formed at an OR contact point as illustrated in FIG. 3F, or a single AND switch may be as large as many separate OR switches. Applying pressure to a switch (e.g., an OR switch or an AND switch) represents asserting the switch and releasing the pressure from the switch represents not asserting the switch. For example, applying pressure to the switch causes the switch to be closed and releasing the pressure causes the switch to be open. In one embodiment, a switch contact point has a circular shape, with a diameter between 7 millimeters to 20 millimeters. In other embodiments, a switch contact point has other shapes including a rectangular shape, a square shape, a diamond shape, etc.

Referring to FIG. 3B, the first layer is printed with conductive ink and includes first portions of an AND array, first portions of an OR array, a common signal 314 and an AND-out signal 316. The wires that connect switch contact points in the first layer are illustrated with solid lines. The first portions of the OR array in the first layer are formed by OR contact points (e.g., the left switch contact point in each switch contact site) and wires that connect the OR contact points in the first layer. In the first layer, the common signal 314 is routed to each OR contact point (e.g., the OR contact points are connected together to the common signal 314). The common signal 314 also connects with the first AND array switch dot (302). The first portions of the AND array in the first layer are formed by AND contact points (e.g., the right switch contact point in each switch contact site) and wires that connect the AND contact points in the first layer. The wires connecting the AND contact points are marked with a symbol "AND." In the illustrated embodiment, the AND contact points are configured to be connected in every other switch contact site.

Referring to FIG. 3C, the second layer includes second portions of the OR array, second portions of the AND array and an OR-out signal 322. The wires that connect switch contact points in the second layer are illustrated with dotted lines. The second portions of the OR array in the second layer are formed by the OR contact points and wires that connect the OR contact points in the second layer. In the second layer, the OR contact points are connected together to the OR-out signal 322. In this case, if any of the OR switches is asserted, current will flow from the common signal 314 inputted in the first layer to the second layer via the asserted OR switch and reaches the OR-out signal 322 as an output. In other words, the OR array is asserted if one OR switch is asserted.

The second portions of the AND array in the second layer are formed by the AND contact points and wires that connect the AND contact points in the second layer. The wires connecting the AND contact points are marked with a symbol "AND." In the illustrated embodiment, the AND contact points are configured to be connected in every other switch contact site.

In the AND array, if all the AND switches are asserted in response to pressure, a single signal flow path is formed from the input (the common signal 314) to the output (the AND-out signal 316). The single signal flow path intervenes between the first layer and the second layer via each asserted AND switch until reaching the AND-out signal output 316. For example, with reference to FIGS. 3B-3D, the signal flow path starts from the AND contact point 302 in the first layer, goes from the first layer to the second layer via an asserted AND switch formed at the AND contact point 302, passes from the AND contact point 302 to the AND contact point 304 via a wire 320 in the second layer, goes back from the second layer to the first layer via an asserted AND switch formed at the AND contact point 304, passes from the AND contact point 304 to the AND contact point 308 via a wire 306 in the first layer, so on and so forth, until reaching the AND contact point 310 in the first layer to output an AND-out signal 316. In this case, all the AND switches are required to be asserted in order to form the signal flow path from the input of the common signal 314 to the output of the AND-out signal 316 for the AND array. In other words, the AND array is asserted if all the AND switches are asserted.

FIG. 3D illustrates an example combination of the first layer, the separation barrier and the second layer. FIG. 3D illustrates that all the OR contact points in the first layer are connected to the common signal 314 and all the OR contact points in the second layer are connected to the OR-out signal 322. If any of the OR switches is asserted in an OR contact point in response to pressure, the OR-out signal 322 or the OR array is asserted. FIG. 3D also illustrates, if all the AND switches are asserted in response to pressure, a single signal flow path is formed that intervenes between the first layer and the second layer via each asserted AND switch until reaching the AND-out signal output 316. If all the AND switches are asserted in all the AND contact points in response to pressure, the AND-out signal 316 or the AND array is asserted.

Figure 4B:
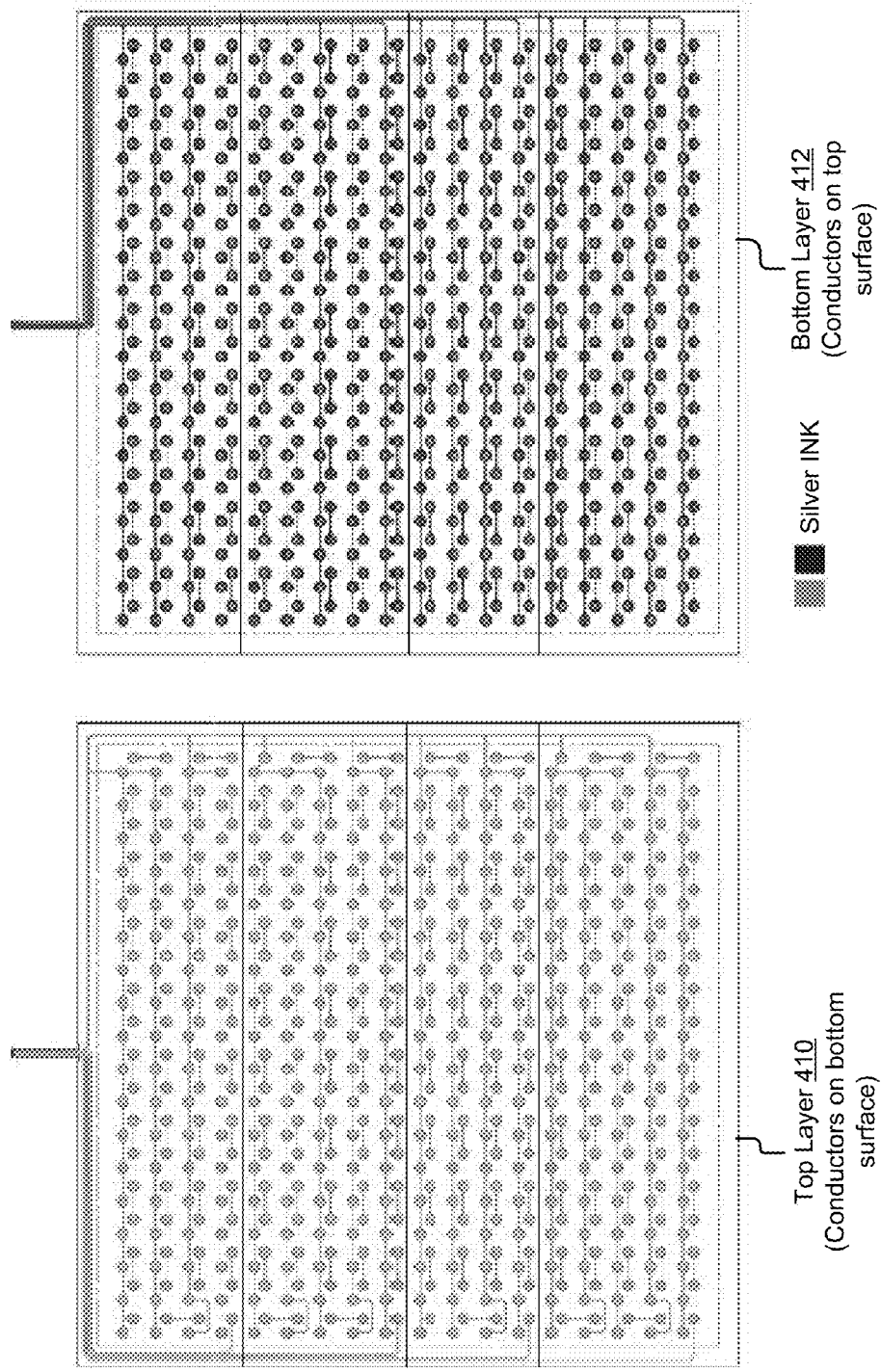
FIG. 4B is a graphic representation of one embodiment of a first layer and a second layer with multiple zones.

In one embodiment, the switch array 135 has multiple zones and each zone is implemented according to the example embodiments illustrated in FIGS. 3B-3D. For example, each zone is implemented with a respective AND array, OR array, AND-out signal and OR-out signal and may share a common signal with other zones. The switch array 135 includes a first layer, a second layer and a separation layer that goes between the first layer and the second layer. The first layer is printed with conductive ink and includes first portions of each AND array for each zone and first portions of each OR array for each zone. The second layer is printed with conductive ink and includes second portions of each AND array for each zone and second portions of each OR array for each zone. The combination of the first layer, the separation barrier and the second layer creates switches in multiple zones. The switches are formed at switch contact points, creating a series of AND switches at AND contact points and a series of OR switches at OR contact points. An example of the first layer and the second layer with multiple zones is illustrated in FIG. 4B.

In some embodiments, the separation barrier may be too strong to allow the layers to contact each other, especially in the case where the items on the shelf are lightweight. The contact can be encouraged by adding actuator bumps, dimples or force concentrators. The actuator bumps, dimples or force concentrators can be added on the top side of the first layer or the bottom side of the second layer.

FIG. 3E is a graphic representation of one embodiment of a detection table. The detection table illustrates that if both an OR array and an AND array in a zone are not asserted, the detection module 204 determines no switch in the zone is closed and a stock status in the zone is empty. If the OR array in the zone is asserted and the AND array in the zone is not asserted, the detection module 204 determines at least one switch in the zone is closed and the stock status in the zone is having presence of at least one item. If both the OR array and the AND array in the zone are asserted, the detection module 204 determines all switches in the zone are closed and the stock status in the zone is full. It is impossible that the OR array is not asserted while the AND array is asserted—this can be a useful indicator for an error condition.

FIG. 3F is a graphic representation of various embodiments of a switch contact site. The illustrated switch contact site 1 and contact site 2 each include an OR contact point and an AND contact point, forming both an OR switch and an AND switch at the respective switch contact site. In the illustrated embodiments, the OR contact point is on the left and the AND contact point is on the right. In other embodiments, the OR contact point can be positioned on the right and the AND contact point can be positioned on the left. In the illustrated switch contact site 1, the OR contact point and the AND contact point are aligned side by side. In the illustrated switch contact site 2, the OR contact point and the AND contact point are aligned diagonally, which covers a larger area and is beneficial for handling manufacturing tolerances with cheaper manufacturing cost. In other embodiments, the OR contact point and the AND contact point can be positioned in any location within the switch contact site and aligned in any order and any geometry.

In one embodiment, some switch contact sites in a zone may only have an OR contact point with no AND contact point, forming only an OR switch at the respective switch contact site. Example switch contact sites including only an OR contact point are illustrated as switch contact sites 4 and 5 in FIG. 3F. In other words, in an area having multiple switch contact sites where multiple OR switches are formed, only a single AND switch may be formed in one of the multiple switch contact sites. For example, for each row in a zone there can be one AND switch for every 10 OR switches. With reference to FIG. 3F, the switch contact sites 3 and 6 each have an OR contact point and an AND contact point, forming both an OR switch and an AND switch in each switch contact site. However, the switch contact sites 4 and 5 each only have an OR contact point, forming only an OR switch in each switch contact site. In this case, there is one AND switch for every three OR switches. Finally, a single AND contact site may be much larger than OR contact sites, making the AND detection easier to assert, depending on the application needs.

Figure 3G:
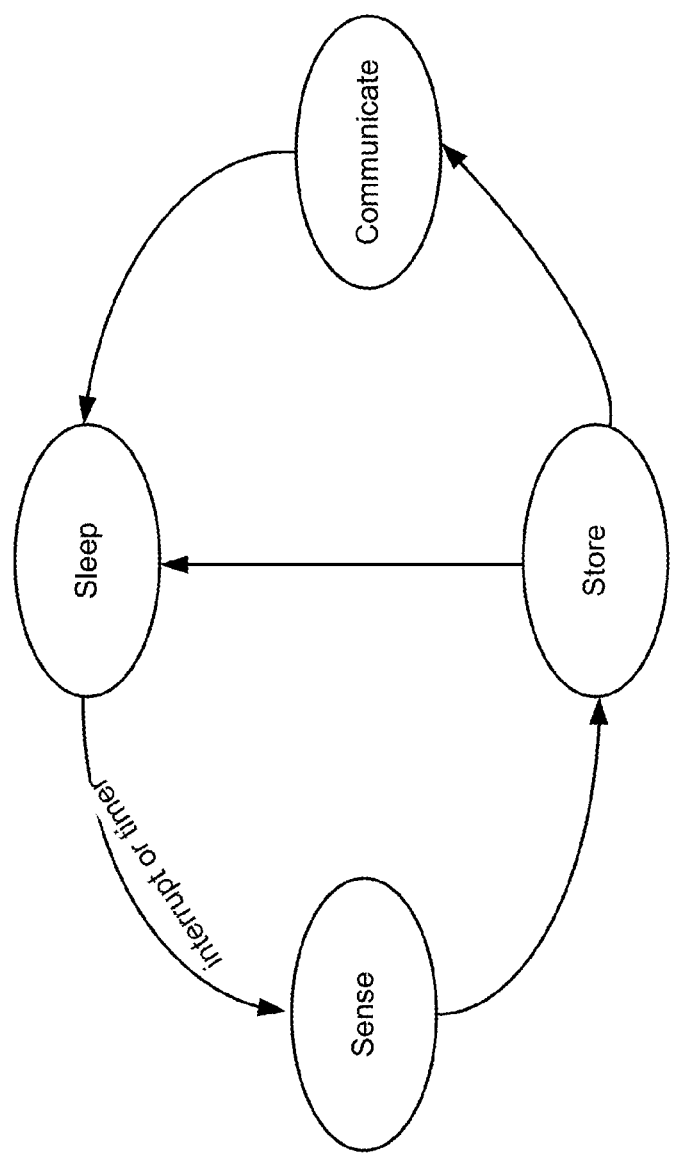
FIG. 3G is a graphic representation of one embodiment of functional operation states of a microcontroller.

FIG. 3G is a graphic representation of one embodiment of various functional operation states of a microcontroller 133. Initially, the microcontroller 133 is in a "sleep" state. Responsive to an "interrupt or timer" signal associated with the switch array 135, the microcontroller 133 exits from the "sleep" state and enters a "sense" state. In the "sense" state, the microcontroller 133 reads one or more AND-out signals and one or more OR-out signals from one or more zones in the array switch 135. The microcontroller 133 exits from the "sense" state and enters a "store" state. In the "store" state, the microcontroller 133 stores data describing the one or more AND-out signals and OR-out signals in a storage device. In some cases, the microcontroller can return immediately from the "store" state to the "sleep" state, so that the data can be communicated at a later time. In other cases, the microcontroller 133 exits from the "store" state and enters a "communicate" state. In the "communicate" state, the microcontroller 133 sends data describing the one or more AND-out signals and OR-out signals to one or more of the stock status application 109, the server 101 and the client device 115. The microcontroller 133 reenters the "sleep" state.

In some embodiments, the microcontroller 133 may have a series of functional operation states different from those shown in FIG. 3G. For example, the microcontroller 133 may go from the "sense" state directly to the "communicate" state. In another example, the microcontroller 133 may have a "process" state that processes data describing the one or more AND-out signals and OR-out signals before transmitting the data to one or more of the stock status applications 109, servers 101 and client devices 115. Other variations for the functional operation states of the microcontroller 133 are possible.

In some embodiments, the occupied shelf area of a particular item does not match the area covered by the pressure sensor as described. If the item occupies an area greater than a single pressure sensor mat, additional pressure sensor mats can be used. The detection module 204 can aggregate the detection results. If the item occupies an area less than a single pressure sensor mat, different mats can be designed, following the same design guidelines already discussed, which are of a variety of sizes, suitable for every application. However, this creates a complex system of many differently-sized mats, and it may be difficult to pre-determine which size should be used where before stocking the shelves.

Figure 3H:
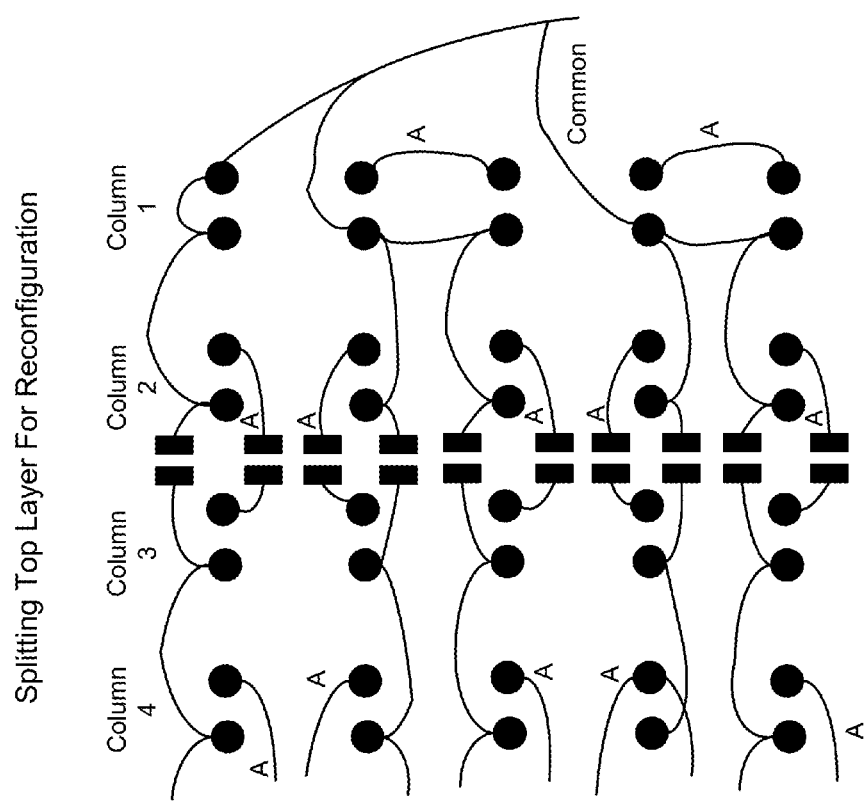
FIG. 3H is a graphic representation of one embodiment of a switch array with a break in the conductive signal traces.

Another solution is to design reconfigurability into the mat. Following the same design guidelines as already described, the top trace layer can be modified to provide a clean break in the conductive signal traces as illustrated in FIG. 3H. In this figure, the interconnect traces for the AND array and the OR array for the mat have been cut. They are routed out to the top side of the top layer and exposed on complementary pads.

Figure 3I:
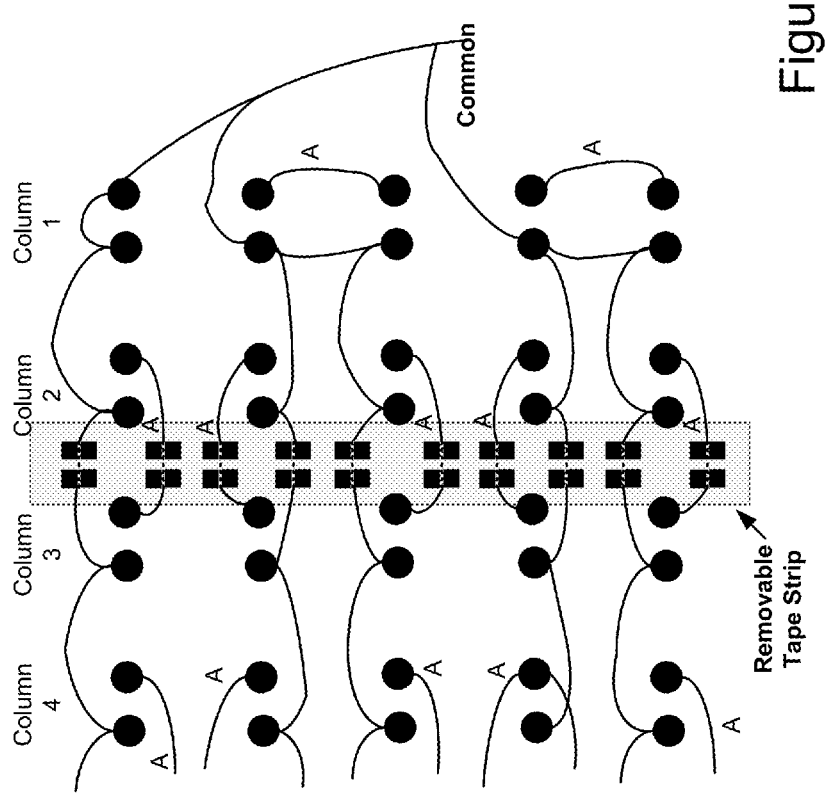
FIG. 3I is a graphic representation of one embodiment of a switch array with a removable tape strip with signal wires.

FIG. 3I is a graphic representation of one embodiment of a switch array with a removable tape strip. At this point, a small piece of tape with conductive ink on it (printed as the original membrane switch layers were printed) can be placed across the top layer, connecting the complementary pads. This is called a Removable Tape Strip. In this case, the Removable Tape Strip has wires that are connected directly across from one another, so that the overall functionality of the mat is unchanged.

For this removable tape strip, it is important that good contact is made between the tape and the top layer of the mat. Some adhesive can add separation between the tape and the mat, therefore making a poor connection. In this case, the adhesive could be applied sparingly, for example only at the edges of the tape, permitting the tape to make flush connection with the topside of the mat. Another option is to use anisotropic conductive film or anisotropic conductive adhesive. This material is commonly used to support flex-cable to circuit board connections in many electronic devices. It conducts electrical signals exclusively in the "z" direction (between the top layer of the mat and the tape), but not the "x" or "y" direction (between lines on the mat or tape). It can also be cured at room temperature. Use of an anisotropic conductive adhesive ensures a good interconnect between the removable tape strip and the top layer of the mat.

Figure 3J:
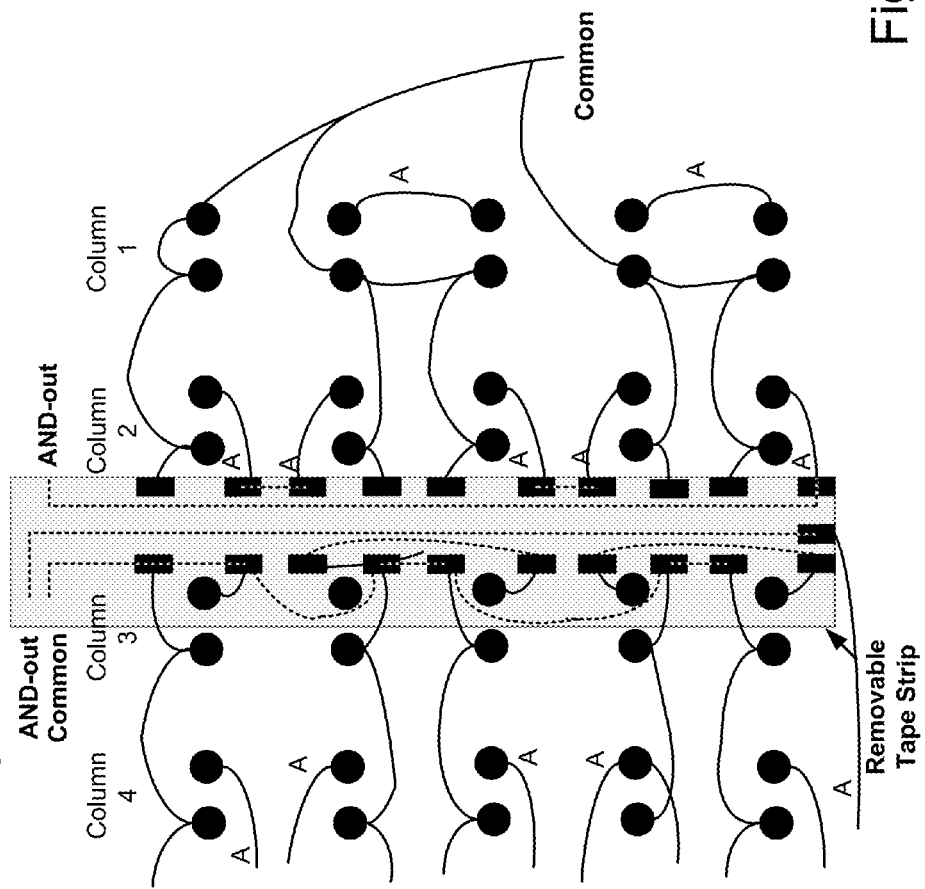
FIG. 3J is a graphic representation of another embodiment of a switch array with a removable tape strip that includes signal wires for different functionality.

When a smaller area shelf mat is needed, instead of replacing the mat with a smaller mat, the mat can simply be reconfigured with a different removable tape strip. FIG. 3J is a graphic representation of one embodiment of a switch array with a different removable tape strip that includes different signal wires. In this case, the removable tape strip now contains signal wires to connect to an additional microcontroller. The additional microcontroller supports the sensing and reporting functions of the additional new section in the mat. The microcontroller is connected to the tape in the same way the first microcontroller is connected to the mat overall.

In detail, the right side of the mat is the original mat, and is terminated as normal. There is no need to connect the pads for the common OR signal together, because they remain interconnected by the original circuits along the far right edge of the mat. The AND signal chain just has to be linked together on the tape, with simple crossings between the pads, and the last AND switch connection point needs to be routed out the removable tape strip (AND_OUT).

The left side shows the new "mat" created within the original mat. In this case, the Common signal must interconnect all the OR array switches on the tape—this is shown by the top left square pad of each interconnect row. The AND array switches need to be started, and then stitched together as before, as shown by the bottom left square pad of each interconnect row on the tape.

The AND array criss-crosses back and forth across the mat, so depending on the mat design, there may be an even number or an odd number, of crosses. In the case of an even number of crosses, the final AND switch is located near the removable tape strip and can be routed directly up to the connector point. In the case of an odd number of crosses as shown, the final AND switch is located at the far side of the mat, and may need to be routed back to the tape, with an extra interconnect pad added to the tape, to route that AND signal out the tape connector (as shown on the left side of the tape).

Finally, the interconnect pads between the removable strip tape and the top layer of the membrane switch mat may be designed in such a way as to facilitate easy alignment of the interconnect (i.e., one part of the interconnect is vertical lines, the other horizontal, so there is sufficient overlap at the intersection point). This way, the tape can be easily applied on the shelf itself, using visual confirmation for alignment.

FIG. 4A is a graphic representation of one embodiment of a sensor 131 with multiple zones in the switch array 135. For example, the switch array 135 has 324 sites, eighteen columns and eighteen rows. A switch contact site is formed at a crossing point of each column and each row. The switch array includes four zones which are Zone 1, Zone 2, Zone 3 and Zone 4. Zone 1 is formed by rows 1 to 5, which becomes a 5×18 site array. Zone 1 has 90 switch contact sites (5×18=90). Similarly, Zone 2 is formed by rows 6 to 9, which becomes a 4×18 site array. Zone 2 has 72 switch contact sites (4×18=72). Zone 3 is formed by rows 10 to 14, which becomes a 5×18 site array. Zone 3 has 90 switch contact sites (5×18=90). Zone 4 is formed by rows 15 to 18, which becomes a 4×18 site array. Zone 4 has 72 switch contact sites (4×18=72). The sensor 131 includes a tail 402. The tail 402 is a component of the sensor 131 where conductive signals outputted from the switch array 135 are brought out to the microcontroller 133 for processing. The tail 402 includes nine conductive signals in total (one common signal, four AND-out signals for the four zones, four OR-out signals for the four zones). In this case, the tail 402 may have ten pins to connect to the microcontroller 133 with nine pins for the nine conductive signals and one dummy pin. The sensor 131 can be placed on a shelf with Zone 1 being placed on the front of the shelf (the side of the shelf facing customers) and the tail 402 being placed at the back of the shelf.

In some embodiments, the sensing area for the sensor 131 illustrated in FIG. 4A is 20 inches×20 inches with a zone resolution of four zones in the switch array 135 and a site resolution of 1-inch spacing between two adjacent switch contact sites. In other embodiments, the sensor 131 may have various sizes for the sensing area, various numbers of zones, various zone resolutions and various site resolutions in each zone. For example, the sensor 131 may have a site resolution of 0.5-inch spacing between two adjacent switch contact sites. The sensor 131 may reduce or increase the number of zones. The determination of the number of zones indicates a compromise between a sensing resolution of the sensor 131 and resource availability (e.g., a compromise between a zone resolution and pins required in the microcontroller 133). For example, an embodiment with fewer zones indicates a lower zone resolution; however, the implementation with fewer zones also indicates less conductive signals are connected to the microcontroller 133 and less pins are needed on the microcontroller 133 (e.g., less resource is needed). For example, an embodiment with more zones indicates a higher zone resolution; however, the embodiment with more zones also indicates more conductive signals are connected to the microcontroller 133 and more pins are needed on the microcontroller 133 (e.g., more resource is needed).

FIG. 4B is a graphic representation of one embodiment of two layers in a switch array 135. The switch array 135 includes multiple zones. The switch array 135 includes a top layer 410 and a bottom layer 412. Each of the top layer 410 and the bottom layer 412 includes a top surface and a bottom surface. The zones are illustrated on the top layer 410 and the bottom layer 412 with black lines. A first set of conductors are printed on the bottom surface of the top layer 410 and a second set of conductors are printed on the top surface of the bottom layer 412. The top layer 410 and the bottom layer 412 are separated by a separation barrier. The combination of the top layer 410, the separation barrier and the bottom layer 412 creates switches in multiple zones.

In one embodiment, the switch array 135 additionally includes a third layer that is placed on the top surface of the top layer 410. The third layer can be an opaque layer that includes different information associated with the shelf. For example, the third opaque layer can include advertising information for items placed on the shelf, pictures of the items or outlines for ordering the items on the shelf. In one embodiment, the bottom surface of the bottom layer 412 can be adhesive so that the sensor 131 is attached to the shelf surface and does not slide around.

Methods

Figure 5A:
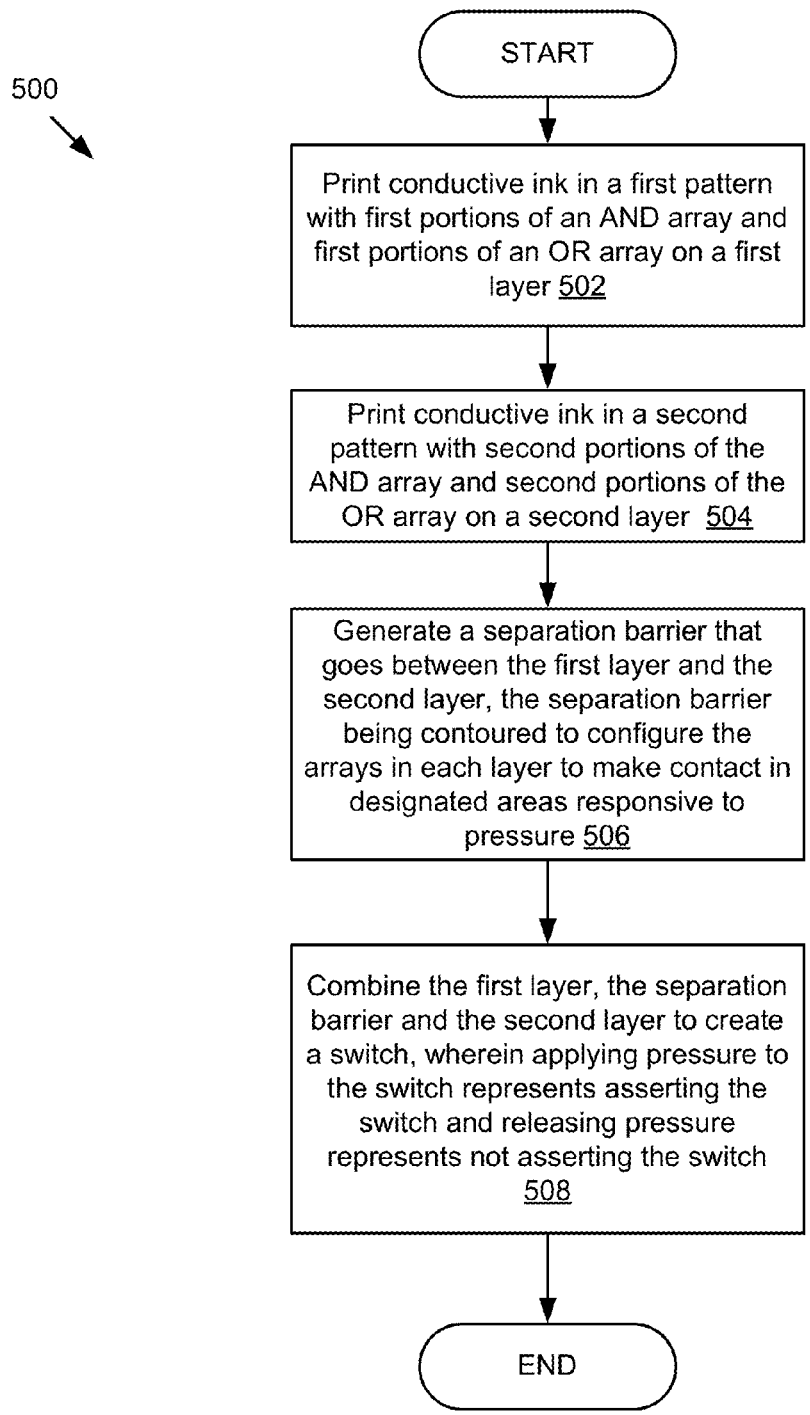
FIG. 5A is a flow diagram of one embodiment of a method for generating a switch.

FIG. 5A is a flow diagram of one embodiment of a method 500 for generating a switch. In one embodiment, the method 500 prints 502 conductive ink in a first pattern with first portions of an AND array and first portions of an OR array on a first layer. For example, the method 500 prints conductive ink in a horizontal pattern with first portions of an AND array and first portions of an OR array on a first layer. The method 500 prints 504 conductive ink in a second pattern with second portions of the AND array and second portions of the OR array on a second layer. For example, the method 500 prints conductive ink in a vertical pattern with second portions of the AND array and second portions of the OR array on a second layer. The method 500 generates 506 a separation barrier that goes between the first layer and the second layer. The separation barrier is contoured to configure the AND array and the OR array in each layer to make contact in designated areas (e.g., switch contact points in switch contact sites) responsive to pressure. The method 500 combines 508 the first layer, the separation barrier and the second layer to create a switch at a switch contact point, where applying pressure to the switch represents asserting the switch and releasing the pressure from the switch represents not asserting the switch.

Figure 5B:
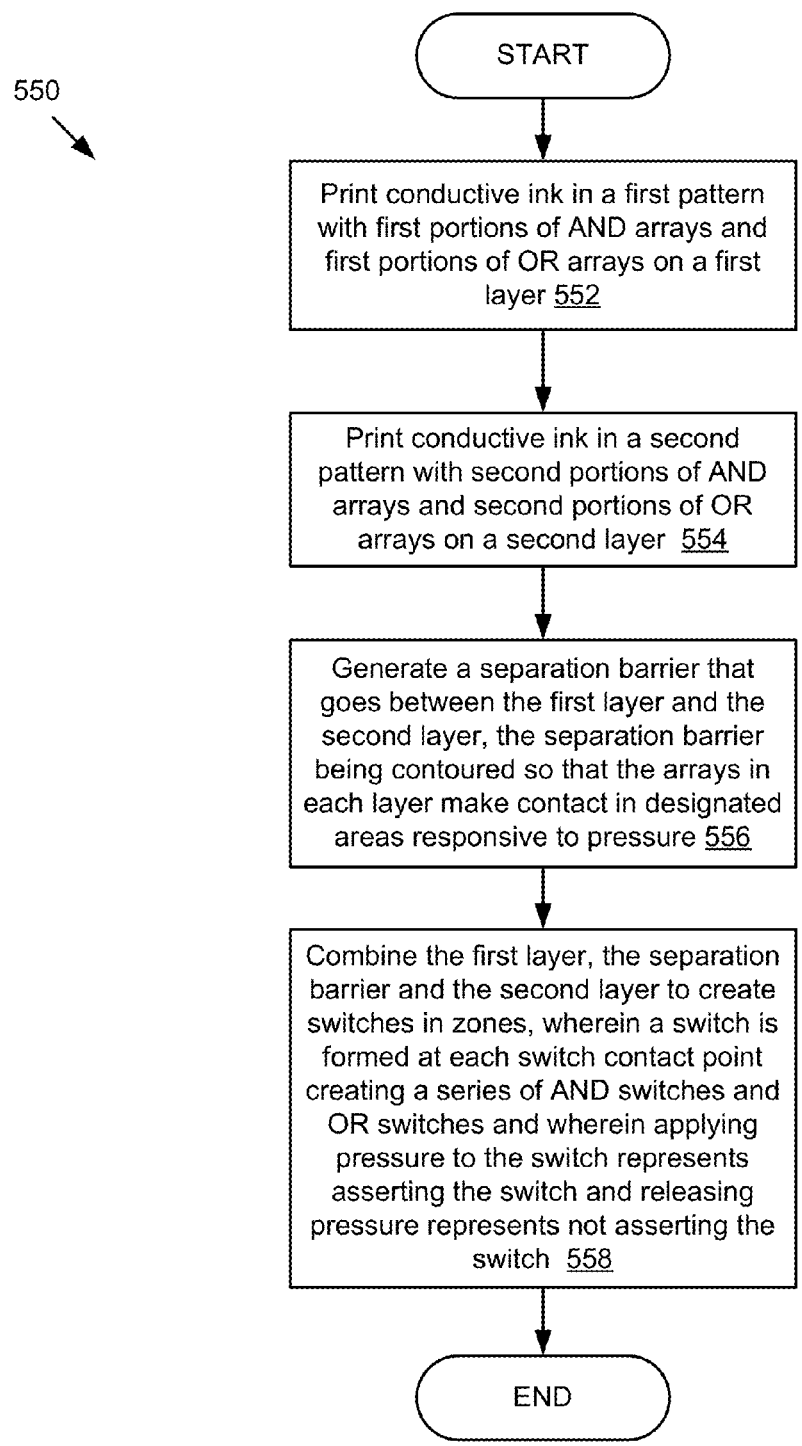
FIG. 5B is a flow diagram of one embodiment of a method for generating switches in one or more zones.

FIG. 5B is a flow diagram of one embodiment of a method 550 for generating switches in one or more zones. In one embodiment, the method 550 prints 552 conductive ink in a first pattern with first portions of one or more AND arrays and first portions of one or more OR arrays on a first layer, where each zone has an AND array and an OR array. The method 550 prints 554 conductive ink in a second pattern with second portions of the one or more AND arrays and second portions of the one or more OR arrays on a second layer. The method 550 generates 556 a separation barrier that goes between the first layer and the second layer. The separation barrier is contoured so that the one or more AND arrays and the one or more OR arrays in each layer make contact in designated areas (e.g., switch contact points) responsive to pressure. The method 550 combines 558 the first layer, the separation barrier and the second layer to create switches in zones, where a switch is formed at each switch contact point. Applying pressure to a switch represents asserting the switch and releasing the pressure from the switch represents not asserting the switch. The combination of the first layer, the separation barrier and the second layer creates a series of AND switches in the one or more AND arrays and OR switches in the one or more OR arrays.

Figure 6:
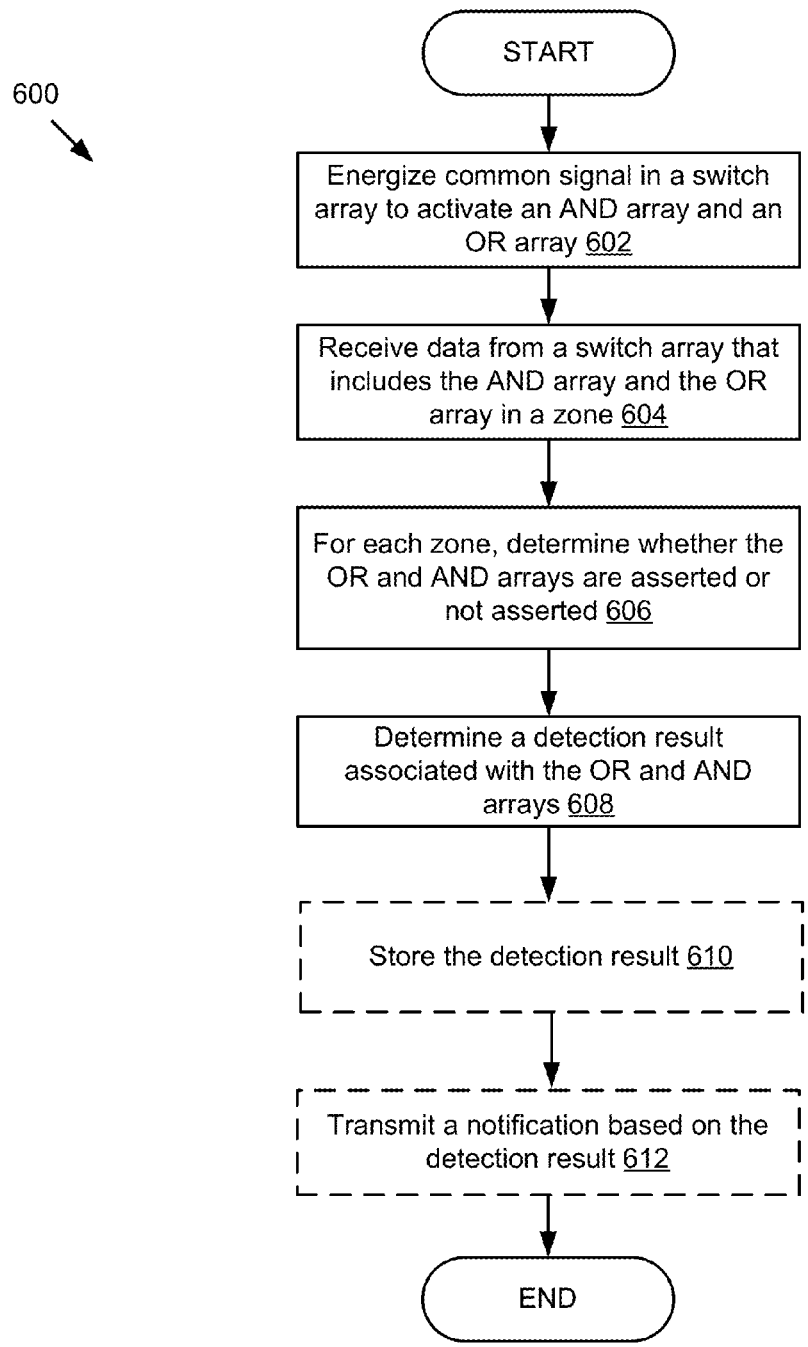
FIG. 6 is a flow diagram of one embodiment of a method for determining a stock status of a shelf.

FIG. 6 is a flow diagram of one embodiment of a method 600 for determining a stock status of a shelf. In one embodiment, the microcontroller 133 energizes 602 a common signal in a switch array 135 to activate an AND array and an OR array. The processing unit 202 receives 604 data from the switch array 135 that includes the AND array and the OR array in each zone. For each zone, the detection module 204 determines 606 whether the OR array and the AND array are asserted or not asserted. The detection module 204 determines 608 a detection result associated with the OR array and the AND array in each zone based on the determination of whether the OR array and the AND array are asserted or not asserted. Optionally, the notification module 208 stores the detections result in a storage location (e.g. the storage 143). Optionally, the stock module 210 determines an overall stock status for the shelf. Optionally, the notification module 208 transmits 610 a notification based on the detection result in each zone.

Figure 7:
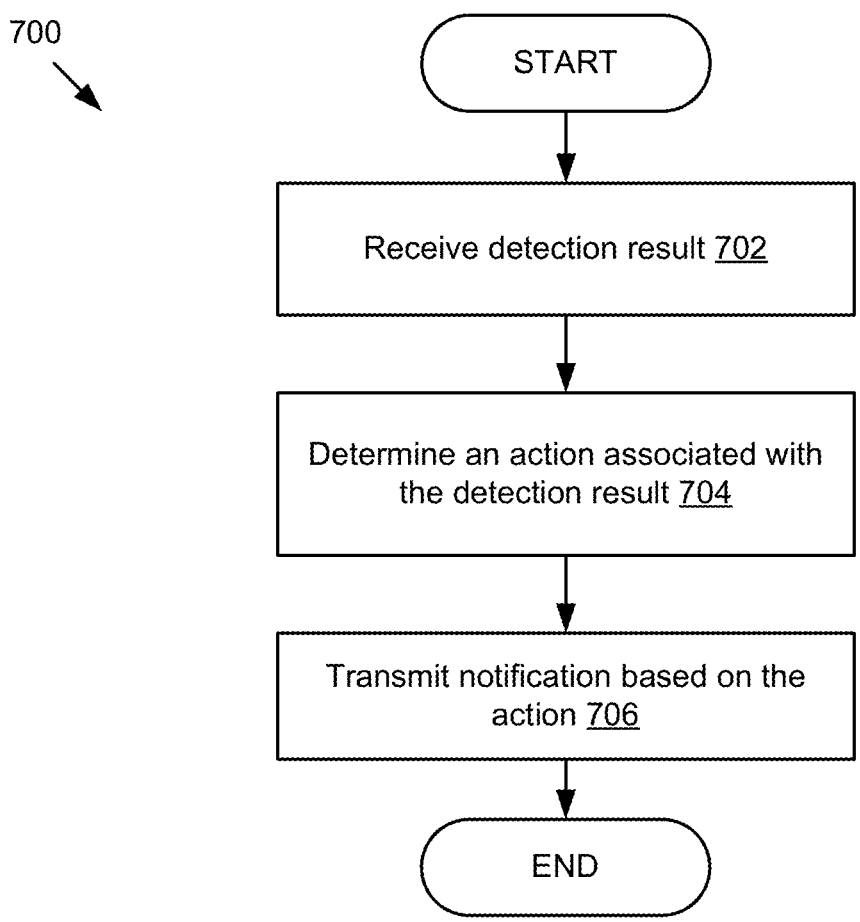
FIG. 7 is a flow diagram of one embodiment of a method for providing a notification.

FIG. 7 is a flow diagram of one embodiment of a method 700 for providing a notification. In one embodiment, the notification module 208 receives 702 a detection result from the detection module 204. The notification module 208 determines 704 an action associated with the detection result. For example, the action is a determination that a shelf should be restocked. The notification module 208 transmits 706 the notification based on the determined action.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
a first layer printed with conductive ink in a first pattern that includes a first plurality of AND-OR contact point pairs, the AND contact points in the first plurality of AND-OR contact point pairs forming a first portion of an AND array and the OR contact points in the first plurality of AND-OR contact point pairs forming a first portion of an OR array;
a second layer printed with conductive ink in a second pattern that includes a second plurality of AND-OR contact point pairs, the AND contact points in the second plurality of AND-OR contact point pairs forming a second portion of the AND array and the OR contact points in the second plurality of AND-OR contact point pairs forming a second portion of the OR array; and
a separation barrier that goes between the first layer and the second layer, the separation barrier being contoured to configure the first plurality of AND-OR contact point pairs in the first layer to make contact with the second plurality of AND-OR contact point pairs in the second layer in designated areas to assert a plurality of AND switches and OR switches responsive to pressure, the combination of the first layer, the second layer and the separation barrier creating a switch array of the plurality of AND switches and OR switches and the AND array being asserted when the plurality of AND switches are asserted and the OR array being asserted when at least one OR switch in the plurality of OR switches is asserted.

2. The system of claim 1, wherein applying pressure to the switch array represents asserting the switch array and releasing the pressure represents not asserting the switch array.

3. The system of claim 1, wherein the combination of the first layer, the second layer and the separation barrier creates the plurality of AND switches and OR switches, and plurality of AND switches and OR switches are formed at the AND-OR contact point pairs creating a series of AND switches and OR switches.

4. The system of claim 1, wherein the switch array is asserted in a first zone and further comprising:
the switch array being asserted in a second zone; and
a microcontroller connected to the first zone and the second zone, the microcontroller configured to aggregate detection results from the first zone and the second zone to detect pressure from an item that is larger than a space occupied by the first zone of the switch array.

5. The system of claim 1, wherein the switch array has interconnected traces cut for the AND array and the OR array and further comprising:
complementary pads that are exposed and in contact with the interconnect traces; and
a removable tape strip with conductive ink across the first layer that is affixed to the complementary pads.

6. The system of claim 1, wherein the switch array has interconnected traces cut for the AND array and the OR array and further comprising:
complementary pads that are exposed and in contact with the interconnect traces; and
a removable tape strip with conductive ink and signal wires connected to a microcontroller across the first layer and connected to the complementary pads.

7. A method comprising:
receiving data from a switch array that includes a combination of a first layer of conductive ink in a first pattern including a first plurality of AND-OR contact point pairs, the AND contact points in the first plurality of AND-OR contact point pairs forming a first portion of an AND array and the OR contact points in the first plurality of AND-OR contact point pairs forming a first portion of an OR array, a second layer of conductive ink in a second pattern including a second plurality of AND-OR contact point pairs, the AND contact points in the second plurality of AND-OR contact point pairs forming a second portion of the AND array and the OR contact points in the second plurality of AND-OR contact point pairs forming a second portion of the OR array, and a separation barrier between the first layer and the second layer, the separation barrier being contoured to configure the first plurality of AND-OR contact point pairs in the first layer to make contact with the second plurality of AND-OR contact point pairs in the second layer in designated areas to assert a plurality of AND switches and OR switches in a zone in the switch array responsive to pressure;
determining whether the AND array and the OR array are asserted or not asserted based on the received data, wherein the AND array is asserted when the plurality of AND switches are asserted and the OR array is asserted when at least one OR switch in the plurality of OR switches is asserted; and
determining a detection result associated with the AND array and the OR array based on the determination of whether the AND array and the OR array are asserted or not asserted.

8. The method of claim 7, further comprising:
determining an action associated with the detection result; and
transmitting a notification based on the action.

9. The method of claim 7, further comprising:
receiving configuration data from a user;
configuring a stock setting using the configuration data; and
wherein the determination of the action is based on the stock setting.

10. The method of claim 7, wherein the detection result includes a zone identifier identifying the zone, a switch closure status and a stock status in the zone.

11. The method of claim 10, wherein:

the OR array and the AND array are not asserted;

the switch closure status indicates the plurality of AND switches and OR switches in the zone are open; and the stock status indicates the zone is empty.

12. The method of claim 10, wherein:

the OR array is asserted and the AND array is not asserted;

the switch closure status indicates at least one OR switch in the zone is closed; and the stock status indicates the zone has presence of at least one item.

13. The method of claim 10, wherein:

the OR array and the AND array are asserted;

the switch closure status indicates that at least one OR switch and the plurality of AND switches in the zone are closed; and the stock status indicates the zone is full.

14. The method of claim 7, wherein the switch array includes multiple zones and the method further comprises:

determining a stock status in each zone of the multiple zones;

determining an overall stock status based on the stock status in each zone; and transmitting a notification based on the overall stock status.

* * * * *